(12) United States Patent
Lee

(10) Patent No.: US 12,738,270 B2
(45) Date of Patent: Sep. 15, 2026

(54) METHOD FOR ANALYZING USER UTTERANCE AND ELECTRONIC DEVICE SUPPORTING THE SAME

(71) Applicant: SAMSUNG ELECTRONICS CO., LTD., Suwon-si (KR)

(72) Inventor: Yoonju Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 248 days.

(21) Appl. No.: 18/236,831

(22) Filed: Aug. 22, 2023

(65) Prior Publication Data

US 2024/0071383 A1 Feb. 29, 2024

Related U.S. Application Data

(63) Continuation of application No. PCT/KR2023/012429, filed on Aug. 22, 2023.

(30) Foreign Application Priority Data

Aug. 22, 2022 (KR) ........................ 10-2022-0105012
Sep. 15, 2022 (KR) ........................ 10-2022-0116686

(51) Int. Cl.
*G10L 15/22* (2006.01)
*G10L 15/18* (2013.01)
*G10L 15/30* (2013.01)

(52) U.S. Cl.
CPC .......... *G10L 15/22* (2013.01); *G10L 15/1815* (2013.01); *G10L 2015/223* (2013.01); *G10L 15/30* (2013.01)

(58) Field of Classification Search
CPC ..... G10L 15/22; G10L 15/1815; G10L 15/30; G10L 2015/223; G10L 15/1822
(Continued)

(56) References Cited

U.S. PATENT DOCUMENTS 6,064,959 A * 5/2000 Young ................... G10L 15/063 704/E15.04
10,049,663 B2 * 8/2018 Orr ......................... G10L 17/22
(Continued)

FOREIGN PATENT DOCUMENTS

CN 106653013 A * 5/2017 ............ G10L 15/08
KR 20120110751 A 10/2012
(Continued)

OTHER PUBLICATIONS

International Search Report and Written Opinion for International Application No. PCT/KR2023/012429; International Filing Date Aug. 22, 2023; Date of Mailing Nov. 23, 2023; 11 Pages.

*Primary Examiner* — Abul K Azad
(74) *Attorney, Agent, or Firm* — CANTOR COLBURN LLP

(57) ABSTRACT

According to an embodiment, an electronic device comprises a microphone and at least one processor operatively connected with the microphone, wherein the processor is configured to obtain one or more commands corresponding to a first utterance obtained through the microphone, based on the first utterance, execute an operation corresponding to a first command having a highest confidence score for the first utterance among the one or more commands, identify that a second utterance obtained through the microphone is an utterance for correcting the operation corresponding to the first command, based on the second utterance, determine a second command having another highest confidence score for the second utterance among the one or more commands except for the first command, based on identifying that the second utterance is the utterance for correcting the operation corresponding to the first command, and execute another operation corresponding to the second command that is determined.

18 Claims, 14 Drawing Sheets

(58) Field of Classification Search
USPC .......................................................... 704/275
See application file for complete search history.

(56) References Cited

U.S. PATENT DOCUMENTS

| | | | | |
|---|---|---|---|---|
| 12,112,742 | B2 * | 10/2024 | Lee | G10L 15/1815 |
| 2005/0027523 | A1 * | 2/2005 | Tarlton | G10L 15/22 704/E15.04 |
| 2008/0162137 | A1 * | 7/2008 | Saitoh | G10L 15/22 704/E15.04 |
| 2014/0188477 | A1 | 7/2014 | Zhang | |
| 2015/0199965 | A1 * | 7/2015 | Leak | G10L 15/22 704/249 |
| 2016/0351190 | A1 * | 12/2016 | Piernot | G06F 3/167 |
| 2017/0102915 | A1 * | 4/2017 | Kuscher | G06F 16/9574 |
| 2017/0133010 | A1 | 5/2017 | Printz | |
| 2018/0018959 | A1 * | 1/2018 | Des Jardins | G10L 15/08 |
| 2018/0113674 | A1 * | 4/2018 | Jin | G10L 15/22 |
| 2019/0130907 | A1 | 5/2019 | Joh | |
| 2020/0035244 | A1 | 1/2020 | Kim | |
| 2020/0051563 | A1 | 2/2020 | Oh et al. | |
| 2020/0365151 | A1 | 11/2020 | Jo et al. | |
| 2021/0082412 | A1 * | 3/2021 | Kennewick | G10L 13/08 |
| 2022/0036883 | A1 * | 2/2022 | Tran | G06F 40/30 |
| 2022/0357915 | A1 * | 11/2022 | Iwase | G06T 7/70 |

FOREIGN PATENT DOCUMENTS

| | | | |
|---|---|---|---|
| KR | 20170068255 | A | 6/2017 |
| KR | 20190049260 | A | 5/2019 |
| KR | 20190059509 | A | 5/2019 |
| KR | 20190107289 | A | 9/2019 |
| KR | 20190125578 | A | 11/2019 |
| KR | 20200017272 | A | 2/2020 |
| KR | 20200074624 | A | 6/2020 |
| WO | 2021073179 | A1 | 4/2021 |

* cited by examiner

| ID | Commands | Confidence scores |
|---|---|---|
| 1 | Music playback | 0.95 |
| 2 | Movie playback | 0.9 |
| 3 | Location search | 0.4 |

| ID | Commands | Confidence scores |
|---|---|---|
| 1 | Music playback | 0.95 |
| 2 | Movie playback | 0.9 |

METHOD FOR ANALYZING USER UTTERANCE AND ELECTRONIC DEVICE SUPPORTING THE SAME

CROSS-REFERENCE TO RELATED APPLICATIONS

This application is a continuation of International Application No. PCT/KR2023/012429 filed on Aug. 22, 2023, designating the United States, in the Korean Intellectual Property Receiving Office, and claiming priority to Korean Patent Application No. 10-2022-0116686 filed on Sep. 15, 2022, and Korean Patent Application No. 10-2022-0105012 filed on Aug. 22, 2022, the disclosures of which are all hereby incorporated by reference herein in their entireties.

BACKGROUND

1. Technical Field

The disclosure relates to a method for analyzing user utterance and an electronic device supporting the same.

2. Description of Related Art

Portable digital communication devices have become a must-have item for everyone in modern era. Customers desire to receive various high-quality services anytime, anywhere using their portable digital communication devices.

The speech recognition service may be a service that provides customers with various content services corresponding to the user's speech received based on a speech recognition interface implemented on portable digital communication devices. In order to provide speech recognition services, portable digital communication devices may be implemented with technologies that recognize and analyze human language (e.g., automatic speech recognition, natural language understanding, natural language generation, machine translation, dialogue system, question and answer, or speech recognition/synthesis).

In order to provide high-quality speech recognition services to consumers, it may be necessary to implement a technology that accurately identifies user intents from user speeches and a technology that provides appropriate content services corresponding to the identified user intents.

SUMMARY

An embodiment of the disclosure aims to perform an operation corresponding to a user utterance that may be interpreted as various intents and perform a corrected operation based on a user utterance for correcting an operation. However, the purpose of the disclosure is not limited to the above description.

According to an embodiment of the disclosure, an electronic device may comprise a microphone and at least one processor operatively connected with the microphone. The at least one processor may obtain one or more commands corresponding to a first utterance obtained through the microphone, based on the first utterance. The at least one processor may execute an operation corresponding to a first command having a highest confidence score for the first utterance among the one or more commands. The at least one processor may identify that a second utterance obtained through the microphone is an utterance for correcting the operation corresponding to the first command, based on the second utterance. The at least one processor may determine a second command having another highest confidence score for the second utterance among the one or more commands except for the first command, based on identifying that the second utterance is the utterance for correcting the operation corresponding to the first command. The at least one processor may execute another operation corresponding to the second command that is determined.

According to an embodiment of the disclosure, a method for analyzing a user utterance by an electronic device may comprise obtaining one or more commands corresponding to a first utterance obtained through a microphone, based on the first utterance. The method may comprise executing an operation corresponding to a first command having a highest confidence score for the first utterance among the one or more commands. The method may comprise identifying that a second utterance obtained through the microphone is an utterance for correcting the operation corresponding to the first command, based on the second utterance. The method may comprise determining a second command having another highest confidence score for the second utterance among the one or more commands excluding the first command, based on identifying that the second utterance is the utterance for correcting the operation corresponding to the first command. The method may comprise executing another operation corresponding to the second command that is determined.

According to an embodiment of the disclosure, in a non-transitory storage medium storing instructions, the instructions may be configured to, when executed by at least one circuit of an electronic device, enable the electronic device to perform at least one operation. The at least one operation may comprise obtaining one or more commands corresponding to a first utterance obtained through a microphone, based on the first utterance. The at least one operation may comprise executing an operation corresponding to a first command having a highest confidence score for the first utterance among the one or more commands. The at least one operation may comprise identifying that a second utterance obtained through the microphone is an utterance for correcting the operation corresponding to the first command, based on the second utterance. The at least one operation may comprise determining a second command having another highest confidence score for the second utterance among the one or more commands excluding the first command, based on identifying that the second utterance is the utterance for correcting the operation corresponding to the first command. The at least one operation may comprise executing another operation corresponding to the second command that is determined.

An embodiment of the disclosure is not limited to the foregoing objectives, and other objectives would readily be appreciated by a skilled artisan from the following detailed description taken in conjunction with the accompanying drawings.

DETAILED DESCRIPTION

Figure 1:
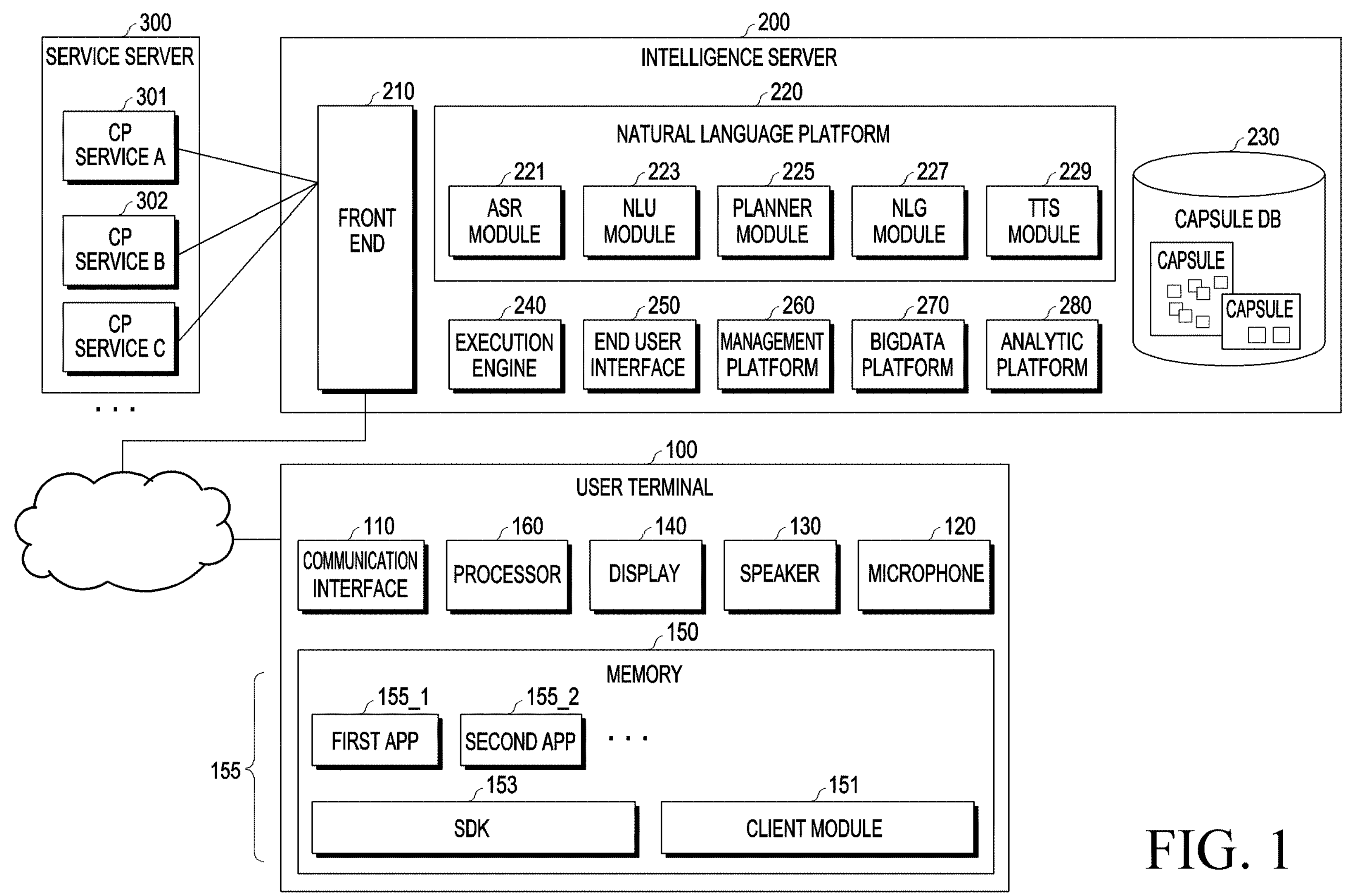
FIG. 1 is a block diagram illustrating an integrated intelligence system according to an embodiment of the disclosure.

FIG. 1 is a block diagram illustrating an integrated intelligence system according to an embodiment.

Referring to FIG. 1, according to an embodiment, an integrated intelligence system 10 may include a user terminal 100, an intelligence server 200, and a service server 300.

According to an embodiment, the user terminal 100 may be a terminal device (or electronic device) that may connect to the Internet, e.g., a mobile phone, smartphone, personal digital assistant (PDA), laptop computer, TV, home appliance, wearable device, head-mounted device (HMD), or smart speaker.

According to the shown embodiment, the user terminal 100 may include a communication interface 110, a microphone 120, a speaker 130, a display 140, a memory 150, or a processor 160. The above-enumerated components may be operatively or electrically connected with each other.

According to an embodiment, the communication interface 110 may be configured to connect to, and transmit/receive data to/from, an external device. According to an embodiment, the microphone 120 may receive a sound (e.g., the user's utterance) and convert the sound into an electrical signal. According to an embodiment, the speaker 130 may output the electrical signal as a sound (e.g., speech). According to an embodiment, the display 140 may be configured to display images or videos. According to an embodiment, the display 140 may display a graphic user interface (GUI) of an app (or application program) that is executed.

According to an embodiment, the memory 150 may store a client module 151, a software development kit (SDK) 153, and a plurality of apps 155. The client module 151 and the SDK 153 may configure a framework (or solution program) for performing general-purpose functions. The client module 151 or SDK 153 may configure a framework for processing speech input.

According to an embodiment, the plurality of apps 155 stored in the memory 150 may be programs for performing designated functions. According to an embodiment, the plurality of apps 155 may include a first app 155_1 and a second app 1552. According to an embodiment, each of the plurality of apps 155 may include a plurality of actions for performing the designated function. For example, the apps may include an alarm app, a messaging app, and/or a scheduler app. According to an embodiment, the plurality of apps 155 may be executed by the processor 160 to sequentially execute at least some of the plurality of operations.

According to an embodiment, the processor 160 may control the overall operation of the user terminal 100. For example, the processor 160 may be electrically connected with the communication interface 110, microphone 120, speaker 130, and display 140 to perform designated operations.

According to an embodiment, the processor 160 may execute the program stored in the memory 150 to perform a designated function. For example, the processor 160 may execute at least one of the client module 151 or the SDK 153 to perform the following operations for processing speech input. The processor 160 may control the operation of the plurality of apps 155 via, e.g., the SDK 153. The following operations described as operations of the client module 151 or SDK 153 may be operations according to the execution of the processor 160.

According to an embodiment, the client module 151 may receive a speech input. For example, the client module 151 may receive a speech signal corresponding to the user's utterance detected via the microphone 120. The client module 151 may transmit the received speech input to the intelligence server 200. The client module 151 may transmit state information about the user terminal 100 along with the received speech input to the intelligent server 200. The state information may be, e.g., app execution state information.

According to an embodiment, the client module 151 may receive a result corresponding to the received speech input. For example, if the intelligent server 200 produces the result corresponding to the received speech input, the client module 151 may receive the result corresponding to the received speech input. The client module 151 may display the received result on the display 140.

According to an embodiment, the client module 151 may receive a plan corresponding to the received speech input. The client module 151 may display the results of execution of the plurality of operations of the app according to the plan on the display 140. The client module 151 may sequentially display, e.g., the results of execution of the plurality of operations on the display. As another example, the user terminal 100 may display only some results of execution of the plurality of operations (e.g., the result of the last operation) on the display.

According to an embodiment, the client module 151 may receive a request for obtaining information necessary to produce the result corresponding to the speech input from the intelligent server 200. According to an embodiment, the client module 151 may transmit the necessary information to the intelligent server 200 in response to the request.

According to an embodiment, the client module 151 may transmit information resulting from executing the plurality of operations according to the plan to the intelligence server 200. The intelligent server 200 may identify that the received speech input has been properly processed using the result information.

According to an embodiment, the client module 151 may include a speech recognition module. According to an embodiment, the client module 151 may recognize the speech input to perform a limited function via the speech recognition module. For example, the client module 151 may perform an intelligence app to process the speech input to perform organic operations via a designated input (e.g., Wake up!).

According to an embodiment, the intelligent server 200 may receive information related to the user speech input from the user terminal 100 via a communication network. According to an embodiment, the intelligent server 200 may convert the data related to the received speech input into text data. According to an embodiment, the intelligent server 200 may generate a plan for performing the task corresponding to the user speech input based on the text data.

According to an embodiment, the plan may be generated by an artificial intelligence (AI) system. The AI system may be a rule-based system or a neural network-based system (e.g., feedforward neural network (FNN)) or recurrent neutral network (RNN)). Additionally, the AI system may be a combination thereof or a system different therefrom. According to an embodiment, the plan may be selected from a set of pre-defined plans or created in real-time in response to a user request. For example, the AI system may select at least one plan from among a plurality of pre-defined plans.

According to an embodiment, the intelligent server 200 may transmit the result according to the generated plan to the user terminal 100 or transmit the generated plan to the user terminal 100. According to an embodiment, the user terminal 100 may display the result according to the plan on the display. According to an embodiment, the user terminal 100 may display the result of execution of the operation according to the plan on the display.

According to an embodiment, the intelligence server 200 may include a front end 210, a natural language platform 220, a capsule database (DB) 230, an execution engine 240, an end user interface 250, a management platform 260, a bigdata platform 270, and/or an analytic platform 280.

According to an embodiment, the front end 210 may receive the speech input from the user terminal 100. The front end 210 may receive a response corresponding to the speech input.

According to an embodiment, the natural language platform 220 may include an automatic speech recognition module (ASR module) 221, a natural language understanding module (NLU module) 223, a planner module 225, a natural language generator module (NLG module) 227, and/or a text to speech module (TTS module) 229.

According to an embodiment, the ASR module 221 may convert the user input received from the user terminal 100 into text data. According to an embodiment, the NLU module 223 may grasp the user's intent using the text data of the speech input. For example, the NLU module 223 may perform syntactic analysis or semantic analysis to grasp the user's intent. According to an embodiment, the NLU module 223 may grasp the meaning of a word extracted from the speech input using linguistic features (e.g., syntactic elements) of morphemes or phrases, match the grasped meaning of the word to the intent, and determine the user's intent.

According to an embodiment, the planner module 225 may generate a plan using the parameter and intent determined by the NLU module 223. According to an embodiment, the planner module 225 may determine a plurality of domains necessary to perform a task based on the determined intent. The planner module 225 may determine the plurality of operations included in the plurality of domains determined based on the intent. According to an embodiment, the planner module 225 may determine parameters necessary to execute the plurality of determined operations or resultant values output by execution of the plurality of operations. The parameters and resultant values may be defined in a designated format (or class) of concept. Thus, the plan may include the plurality of operations determined by the user's intent and a plurality of concepts. The planner module 225 may stepwise (or hierarchically) determine the relationship between the plurality of operations and the plurality of concepts. For example, the planner module 225 may determine the order of execution of the plurality of operations determined based on the user's intent based on the plurality of concepts. In other words, the planner module 225 may determine the order of execution of the plurality of operations based on the result output by execution of the plurality of operations and the parameters necessary to execute the plurality of operations. Thus, the planner module 225 may generate a plan that contains association information (e.g., ontology) between the plurality of operations and the plurality of concepts. A plan may be generated using information stored in the capsule DB 230 that stores a set of concept-operation relationships.

According to an embodiment, the NLG module 227 may convert designated information into a text type. The text-type information may be in the form of a natural language utterance. According to an embodiment, the TTS module 229 may convert text-type information into speech-type information.

According to an embodiment, all or some of the functions of the natural language platform 220 may also be implemented in the user terminal 100.

The capsule DB 230 may store information about the relationship between the plurality of concepts and operations corresponding to the plurality of domains. According to an embodiment, the capsule DB 230 may include a plurality of concept objects (or concept information) and a plurality of action objects (or action information) included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry storing strategy information necessary to determine the plan corresponding to the speech input. The strategy information may include reference information for determining one plan if there are a plurality of plans corresponding to the speech input. According to an embodiment, the capsule DB 230 may include a follow up registry storing follow up information to propose a subsequent action to the user in a designated context. The subsequent action may include, e.g., a subsequent utterance. According to an embodiment, the capsule DB 230 may include a layout registry storing layout information about the information output via the user terminal 100. According to an embodiment, the capsule DB 230 may include a vocabulary registry storing vocabulary information included in capsule information. According to an embodiment, the capsule DB 230 may include a dialog registry storing dialog (or interaction) information with the user. The capsule DB 230 may update the stored object via a developer tool. The developer tool may include a function editor for updating, e.g., the action object or concept object. The developer tool may include a vocabulary editor for updating the vocabulary. The developer tool may include a strategy editor to generate and register a strategy to determine a plan. The developer tool may include a dialog editor to generate a dialog with the user. The developer tool may include a follow up editor capable of activating a subsequent goal and editing a subsequent utterance to provide a hint. The subsequent goal may be determined based on the current goal, the user's preference, and/or environmental conditions. According to an embodiment, the capsule DB 230 may also be implemented in the user terminal 100.

According to an embodiment, the execution engine 240 may produce a result using the generated plan. The end user interface 250 may transmit the produced result to the user terminal 100. Thus, the user terminal 100 may receive the result and provide the received result to the user. According to an embodiment, the management platform 260 may manage information used in the intelligent server 200. According to an embodiment, the bigdata platform 270 may gather user data. According to an embodiment, the analytic platform 280 may manage the quality of service (QoS) of the intelligent server 200. For example, the analytic platform 280 may manage the components and processing speed (or efficiency) of the intelligent server 200.

According to an embodiment, the service server 300 may provide a designated service (e.g., food ordering, hotel booking, ride/transportation services, etc.) to the user terminal 100. According to an embodiment, the service server 300 may be a server operated by a third party. According to an embodiment, the service server 300 may provide information for generating the plan corresponding to the received speech input to the intelligent server 200. The provided information may be stored in the capsule DB 230. The service server 300 may provide result information according to the plan to the intelligent server 200.

In the above-described integrated intelligence system 10, the user terminal 100 may provide various intelligent services to the user in response to user inputs. The user inputs may include, e.g., inputs using physical buttons, touch inputs, and/or speech inputs.

According to an embodiment, the user terminal 100 may provide a speech recognition service via an intelligence app (or speech recognition app) stored therein. In this case, for example, the user terminal 100 may recognize the user utterance or speech input received via the microphone and provide the service corresponding to the recognized speech input to the user.

According to an embodiment, the user terminal 100 may perform a designated operation, alone or together with the intelligent server and/or a service server, based on the received speech input. For example, the user terminal 100 may execute the app corresponding to the received speech input and perform a designated operation via the executed app.

According to an embodiment, when the user terminal 100, together with the intelligent server 200 and/or service server 300, provides the service, the user terminal 100 may detect a user utterance using the microphone 120 and generate a signal (or speech data) corresponding to the detected user utterance. The user terminal 100 may transmit the speech data to the intelligence server 200 via the communication interface 110. Example services of the service server 300 can include capsule (CP) service A 301, CP service B 302, CP service C, etc.

According to an embodiment, in response to the speech input received from the user terminal 100, the intelligent server 200 may generate a plan for performing the task corresponding to the speech input or the result of the operation performed according to the plan. The plan may include a plurality of actions for performing the task corresponding to the user's speech input and a plurality of concepts related to the plurality of actions. The concept may be one defining parameter input upon execution of the plurality of actions or one defining parameter input after the resultant value is output by execution of the plurality of actions. The plan may include association information between the plurality of actions and the plurality of concepts.

According to an embodiment, the user terminal 100 may receive the response via the communication interface 110. The user terminal 100 may output the speech signal generated inside the user terminal 100 to the outside using the speaker 130 or may output the image generated inside the user terminal 100 to the outside using the display 140.

Figure 2:
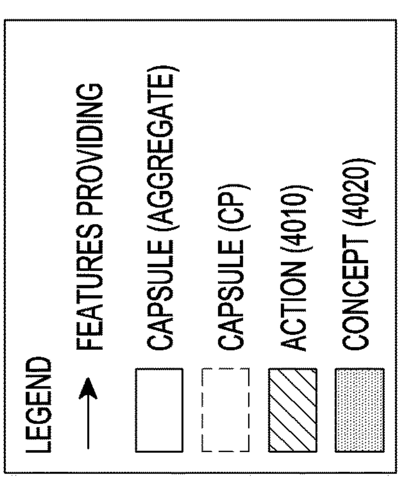
FIG. 2 is a view illustrating an example in which information for the relationship between concept and action is stored in a database according to an embodiment of the disclosure.
Figure 2:
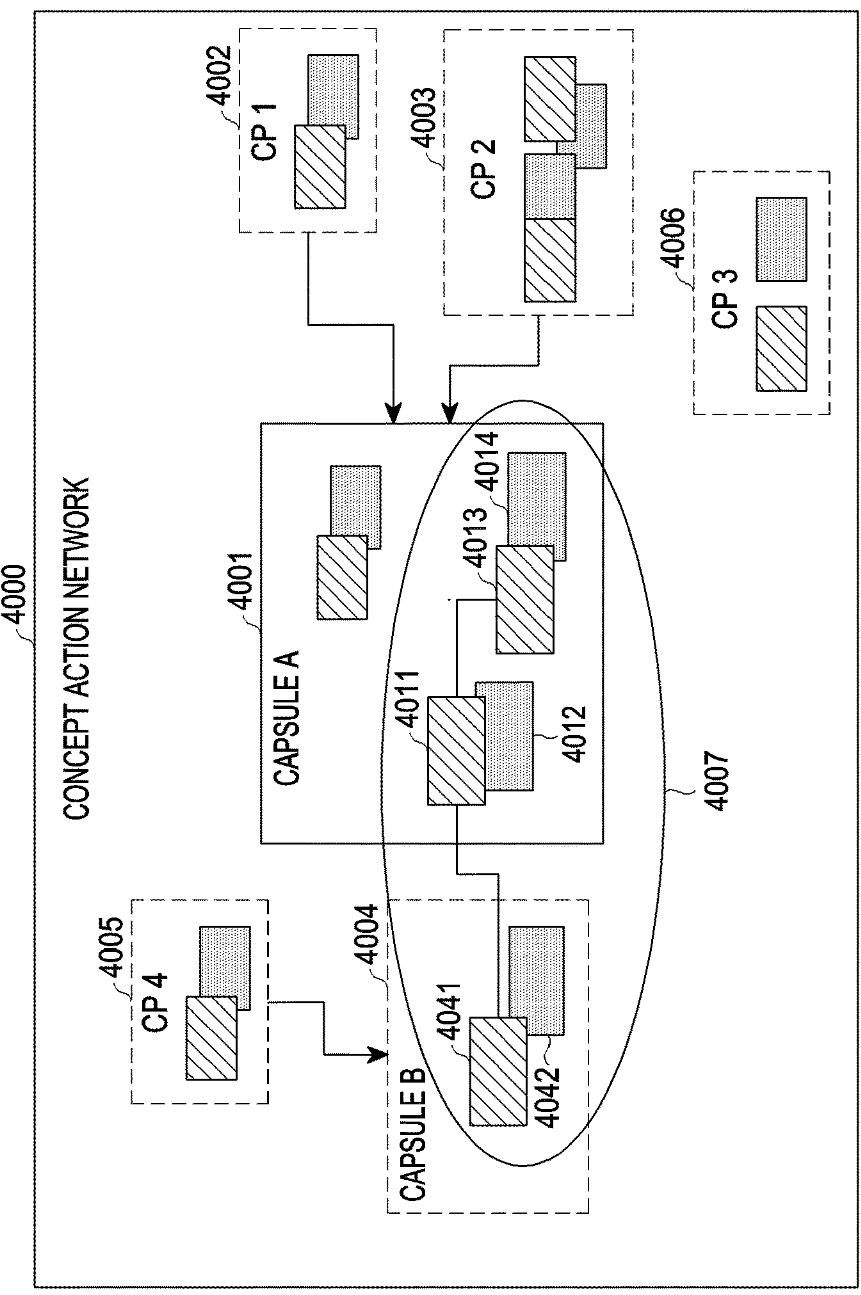

FIG. 2 is a view illustrating an example in which information for the relationship between concept and action is stored in a database according to an embodiment.

A capsule database (e.g., the capsule database 230) of the intelligent server 200 may store capsules in the form of a concept action network (CAN) 4000. The capsule database may store an operation for processing a task corresponding to the user's speech input and a parameter necessary for the operation in the form of the concept action network (CAN) 4000.

The capsule database according to an embodiment may store a plurality of capsules (capsule A 4001 and capsule B 4004) respectively corresponding to a plurality of domains (e.g., applications). According to an embodiment, one capsule (e.g., capsule A 4001) may correspond to one domain (e.g., location (geo), application). Further, one capsule may correspond to at least one service provider (e.g., CP 1 4002, CP 2 4003, CP 3 4006, or CP 4 4005) for performing a function for a domain related to the capsule. According to an embodiment, one capsule may include at least one or more actions and at least one or more concepts for performing a designated function.

The natural language platform 220 may generate a plan for performing a task corresponding to the received speech input using a capsule stored in the capsule database. For example, the planner module 225 of the natural language platform may generate a plan using a capsule stored in the capsule database. For example, a plan 4007 may be generated using actions 4011 and 4013 and concepts 4012 and 4014 of capsule A 4001 and an action 4041 and concept 4042 of capsule B 4004.

Figure 3:
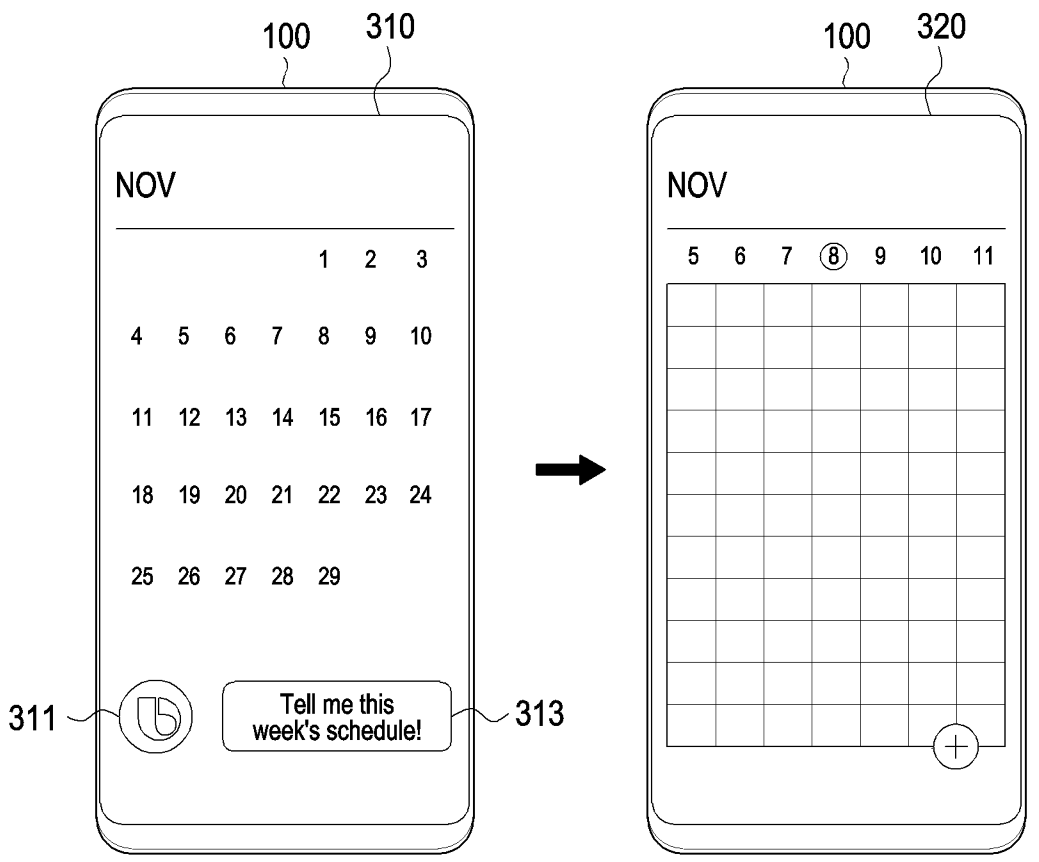
FIG. 3 is a view illustrating a user terminal displaying a screen for processing a speech input received through an intelligent app according to an embodiment of the disclosure.

FIG. 3 is a view illustrating a screen in which a user terminal processes a speech input received through an intelligent app according to various embodiments.

The user terminal 100 may execute an intelligent app to process user inputs through the intelligent server 200.

According to an embodiment, upon recognizing a designated speech input (e.g., a wakeup command) or receiving an input through a hardware key (e.g., a dedicated hardware key) on a screen 310, the user terminal 100 may execute the intelligent app to process the speech input. The user terminal 100 may, e.g., execute the intelligent app, with a scheduler app running. According to an embodiment, the user terminal 100 may display an object (e.g., an icon) 311 corresponding to the intelligent app on the display 140. According to an embodiment, the user terminal 100 may receive a speech input by a user utterance. For example, the user terminal 100 may receive a speech input saying "Tell me this week's schedule!". According to an embodiment, the user terminal 100 may display a user interface (UI) 313 (e.g., an input window) of the intelligent app displaying the text data of the received speech input on the display.

According to an embodiment, on a screen 320, the user terminal 100 may display a result corresponding to the received speech input on the display. For example, the user terminal 100 may receive the plan corresponding to the received user input, and display a 'this week's schedule' on the display according to the plan.

Figure 4:
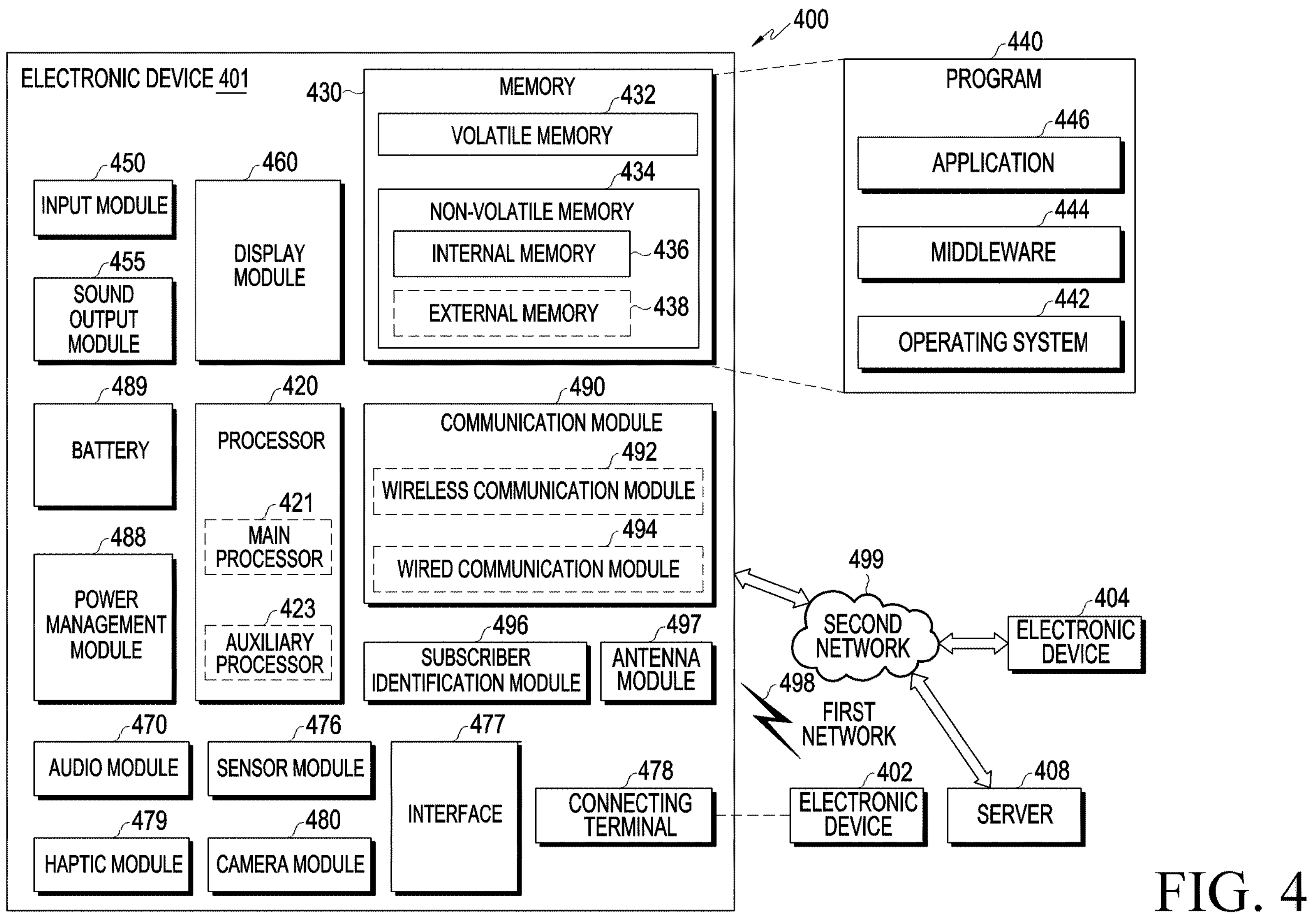
FIG. 4 is a block diagram illustrating an electronic device in a network environment according to an embodiment of the disclosure.

FIG. 4 is a block diagram illustrating an electronic device 411 in a network environment 400 according to an embodiment of the disclosure.

Referring to FIG. 4, the electronic device 401 in the network environment 400 may communicate with at least one of an electronic device 402 via a first network 498 (e.g., a short-range wireless communication network), or an electronic device 404 or a server 408 via a second network 499 (e.g., a long-range wireless communication network). According to an embodiment, the electronic device 411 may communicate with the electronic device 404 via the server 408. According to an embodiment, the electronic device 401 may include a processor 420, memory 430, an input module 450, a sound output module 455, a display module 460, an audio module 470, a sensor module 476, an interface 477, a connecting terminal 478, a haptic module 479, a camera module 480, a power management module 488, a battery 489, a communication module 490, a subscriber identification module (SIM) 496, or an antenna module 497. In an embodiment, at least one (e.g., the connecting terminal 478) of the components may be omitted from the electronic device 401, or one or more other components may be added in the electronic device 101. According to an embodiment, some (e.g., the sensor module 476, the camera module 480, or the antenna module 497) of the components may be integrated into a single component (e.g., the display module 460).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may store a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), or an auxiliary processor 423 (e.g., a graphics processing unit (GPU), a neural processing unit (NPU), an image signal processor (ISP), a sensor hub processor, or a communication processor (CP)) that is operable independently from, or in conjunction with, the main processor 421. For example, when the electronic device 401 includes the main processor 421 and the auxiliary processor 423, the auxiliary processor 423 may be configured to use lower power than the main processor 421 or to be specified for a designated function. The auxiliary processor 423 may be implemented as separate from, or as part of the main processor 421.

The auxiliary processor 423 may control at least some of functions or states related to at least one component (e.g., the display module 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423. According to an embodiment, the auxiliary processor 423 (e.g., the neural processing unit) may include a hardware structure specified for artificial intelligence model processing. The artificial intelligence model may be generated via machine learning. Such learning may be performed, e.g., by the electronic device 401 where the artificial intelligence is performed or via a separate server (e.g., the server 408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input module 450 may receive a command or data to be used by other component (e.g., the processor 420) of the electronic device 401, from the outside (e.g., a user) of the electronic device 401. The input module 450 may include, for example, a microphone, a mouse, a keyboard, keys (e.g., buttons), or a digital pen (e.g., a stylus pen).

The sound output module 455 may output sound signals to the outside of the electronic device 401. The sound output module 455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 460 may visually provide information to the outside (e.g., a user) of the electronic device 401. The display 460 may include, for example, a display, a hologram device, or a projector and control circuitry to control a corresponding one of the display, hologram device, and projector. According to an embodiment, the display 460 may include a touch sensor configured to detect a touch, or a pressure sensor configured to measure the intensity of a force generated by the touch.

The audio module 470 may convert a sound into an electrical signal and vice versa. According to an embodiment, the audio module 470 may obtain the sound via the input module 450, or output the sound via the sound output module 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 101, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or motion) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device 404 via a first network 498 (e.g., a short-range communication network, such as Bluetooth™, wireless-fidelity (Wi-Fi) direct, or infrared data association (IrDA)) or a second network 499 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 492 may identify or authenticate the electronic device 401 in a communication network, such as the first network 498 or the second network 499, using subscriber information (e.g., international mobile subscriber identity (IMSI)) stored in the subscriber identification module 496.

The wireless communication module 492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 492 may support a high-frequency band (e.g., the mmWave band) to achieve, e.g., a high data transmission rate. The wireless communication module 492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 492 may support various requirements specified in the electronic device 401, an external electronic device (e.g., the electronic device 404), or a network system (e.g., the second network 499). According to an embodiment, the wireless communication module 492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 497 may transmit or receive a signal or power to or from the outside (e.g., the external electronic device). According to an embodiment, the antenna module 497 may include one antenna including a radiator formed of a conductor or conductive pattern formed on a substrate (e.g., a printed circuit board (PCB)). According to an embodiment, the antenna module 497 may include a plurality of antennas (e.g., an antenna array). In this case, at least one antenna appropriate for a communication scheme used in a communication network, such as the first network 498 or the second network 499, may be selected from the plurality of antennas by, e.g., the communication module 490. The signal or the power may then be transmitted or received between the communication module 490 and the external electronic device via the selected at least one antenna. According to an embodiment, other parts (e.g., radio frequency integrated circuit (RFIC)) than the radiator may be further formed as part of the antenna module 497.

According to an embodiment, the antenna module 497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. The external electronic devices 402 or 404 each may be a device of the same or a different type from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, mobile edge computing (MEC), or client-server computing technology may be used, for example. The electronic device 401 may provide ultra low-latency services using, e.g., distributed computing or mobile edge computing. In another embodiment, the external electronic device 404 may include an Internet-of-things (IoT) device. The server 408 may be an intelligent server using machine learning and/or a neural network. According to an embodiment, the external electronic device 404 or the server 408 may be included in the second network 499. The electronic device 401 may be applied to intelligent services (e.g., smart home, smart city, smart car, or health-care) based on 5G communication technology or IoT-related technology.

Figure 5:
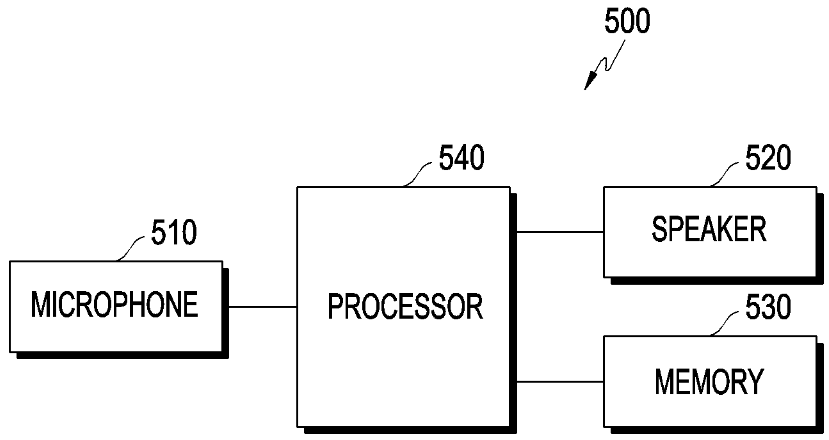
FIG. 5 is a block diagram illustrating an electronic device according to an embodiment of the disclosure.

FIG. 5 is a block diagram illustrating an electronic device 500 according to an embodiment of the disclosure.

Referring to FIG. 5, in an embodiment, an electronic device 500 may include a microphone 510, a speaker 520, a memory 530, and at least one processor 540 operatively connected with the microphone 510, the speaker 520, and the memory 530.

In an embodiment, the microphone 510 may be included in the microphone 120 of FIG. 1 and the input module 450 of FIG. 4.

In an embodiment, the speaker 520 may be included in the speaker 130 of FIG. 1 and the sound output module 455 of FIG. 4.

In an embodiment, the memory 530 may be included in the memory 150 of FIG. 1 and the memory 430 of FIG. 4.

In an embodiment, the memory 530 may store one or more commands obtained from a user utterance. Information stored in the memory 530 is described below.

In an embodiment, the processor 540 may be included in the processor 160 of FIG. 1 and the processor 420 of FIG. 4.

In an embodiment, the processor 540 may control the overall operation for analyzing user utterances. In an embodiment, the processor 540 may include one or more processors for analyzing user utterances. An operation performed by the processor 540 to analyze the user utterance is described below with reference to FIGS. 6-9, 10A, 10B, 11-13, 14A, and 14B.

In an embodiment, the electronic device 500 may be an on-device electronic device for processing the user utterance. In an embodiment, a natural language platform 220 may be stored in the memory 530 for the processor 540 to process the user utterance obtained through the microphone 510. In an embodiment, the natural language platform 220 stored in the memory 530 may be executed by the processor 540. In an embodiment, the natural language platform 220 stored in the memory 530 may be implemented in hardware as well as software.

In an embodiment, the processor 540 may perform the function of the natural language platform 220 included in the intelligent server 200 of FIG. 1 by executing the natural language platform 220. For example, the natural language platform 220 may include an automatic speech recognition module (e.g., the automatic speech recognition module 221 of FIG. 1), a natural language understanding module (e.g., the natural language understanding module 223 of FIG. 1), a planner module (e.g., the planner module 225 of FIG. 1), a natural language generator module (e.g., the natural language generator module 227 of FIG. 1), or a text-to-speech module (e.g., the text-to-speech module 229 of FIG. 1). The function of the natural language platform 220 performed by the intelligent server 200 may be performed by the electronic device 500.

Although FIG. 5 illustrates an example in which the electronic device 500 includes the microphone 510, the speaker 520, the memory 530, and/or the processor 540, it is not limited thereto. For example, the electronic device 500 may further include at least one component shown in FIGS. 1 and 4. In an embodiment, the electronic device 500 may further include a communication module (e.g., the communication interface 110 of FIG. 1 or the communication module 490 of FIG. 4) for communicating with an external electronic device.

Figure 6:
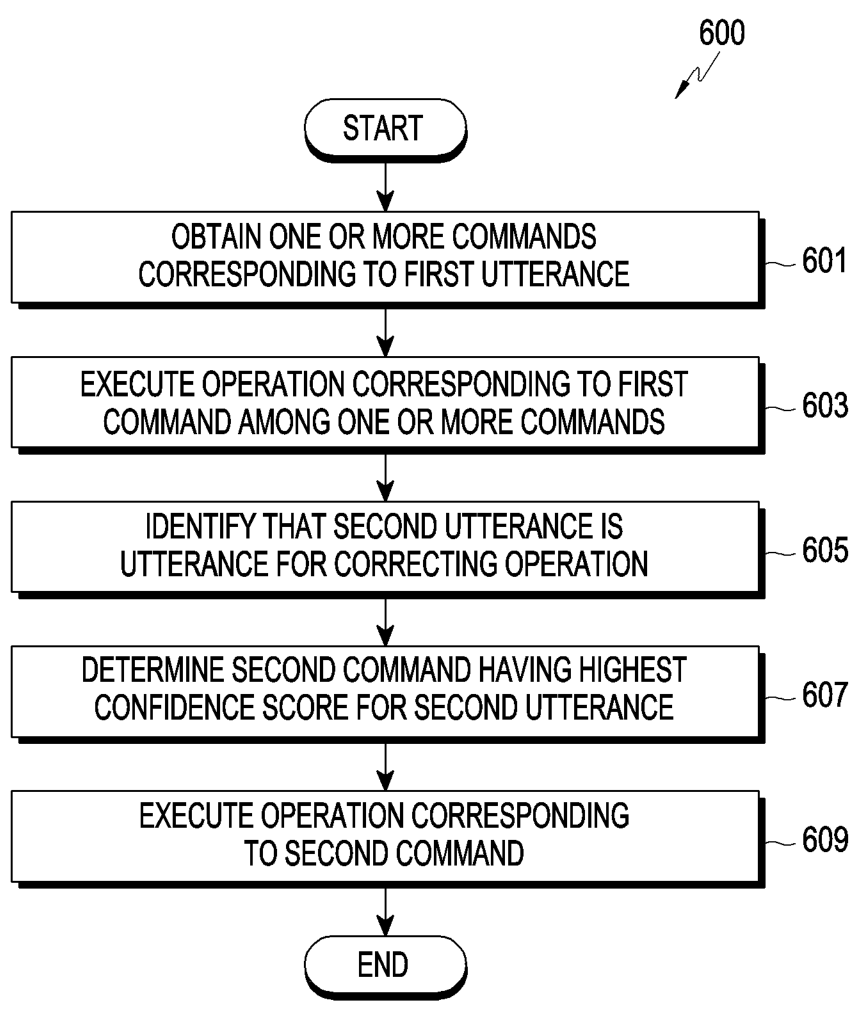
FIG. 6 is a flowchart illustrating an operation of analyzing a user utterance by an electronic device according to an embodiment of the disclosure.

FIG. 6 is a flowchart 600 illustrating an operation of analyzing a user utterance by an electronic device 500 according to an embodiment of the disclosure.

Referring to FIG. 6, in operation 601, in an embodiment, the processor 540 may obtain one or more commands corresponding to a first utterance.

In an embodiment, the processor 540 may obtain (or generate) one or more commands corresponding to the first utterance, based on the obtained first utterance obtained through the microphone 510. The first utterance may be a user utterance having the intent to perform a specific operation. In one or more embodiments, the processor 540 can map the intent to a concept in the capsule database 230 and/or the CAN 4000, and the one or more commands corresponding to the first utterance can include an action associated the concept. In one or more embodiments, the processor 540 may obtain the intent of the first utterance through a natural language platform (e.g., the natural language platform 220 of FIG. 1). In an embodiment, the processor 540 may obtain at least one of a confidence score and a matched ID corresponding to each of one or more commands by the natural language platform 220, using any known technique understood by one of ordinary skill in the art. The processor 540 can utilize a predetermined weighting system to obtain confidence scores for the one or more commands and rank the one or more commands with according to their respective confidence scores. In an embodiment, the processor 540 may determine a command having the highest confidence score among one or more commands as a command matching the user utterance. The processor 540 may execute an operation corresponding to the command based on identifying the matched ID of the determined command. The processor 540 may store in the memory 530 one or more obtained commands, based on the interpretation by the natural language platform 220 that the first utterance has one or more intents. In an embodiment, the processor 540 may store the confidence score and matched ID corresponding to each of one or more commands in the memory 530. The natural language platform 220 can be trained on training data having numerous utterances labeled with their respective intents. The natural language platform 220 is trained to determine the intent of the utterance. Using an ontology, the natural language platform 220, a software application, and/or a machine learning model are configured to match the determined intent to one or more commands.

In an embodiment, the command stored in the memory 530 may include information about at least one of a goal, a category, a capsule, and a signal. In an embodiment, the processor 540 may store one or more commands in the memory 530 according to the format of Table 1. The processor 540 may store commands including information about goals and capsules in the memory 530. The processor 540 may store the commands in the memory 530 according to the format of Table 1 and then perform an operation corresponding to the command based on the domain included in the command. In an embodiment, the processor 540 may execute an operation corresponding to a command corresponding to the first identifier (ID). The processor may execute an operation for playing "Bohemian Rhapsody", which is the title of the song, based on the goal information (bixby.mediaResolverPlay) included in the command corresponding to the first identifier. In an embodiment, after executing the operation, the processor 540 may store an executed ID for the command having the first identifier in the memory 530. The processor 540 may identify whether executed IDs respectively corresponding to one or more commands are previously stored to determine a (subsequent) command corresponding to a user utterance for correcting an executed operation. The processor 540 may determine that the (subsequent) command corresponding to the user utterance is for correcting the executed operation among one or more commands except for the command corresponding to the executed ID, based on identifying that the executed ID is previously stored.

TABLE 1

| ID | commands | confidence score | matched ID | executed ID |
|---|---|---|---|---|
| 1 | Intent { goal { bixby.mediaResolver.Play @context (Outer) } value { bixby.mediaResolver.SongTitle (Bohemidan Rhapsody) } } | 0.95 | 1 | #### |
| 2 | Intent { goal { bixby.mediaResolver.Play @context (Outer) } value { bixby.mediaResolver.MovieTitle (Bohemidan Rhapsody) } } | 0.9 | 2 | |

In an embodiment, the processor 540 may store one or more commands in the memory 530 according to the format of Table 2. The processor 540 may store commands including information about goals, categories, and capsules in the memory 530. The processor 540 may store category information obtained while performing the operation corresponding to the command in the memory 530 according to the format of Table 2.

TABLE 2

| ID | commands | confidence score | matched ID | executed ID |
|---|---|---|---|---|
| 1 | Intent { goal { bixby.mediaResolver.Play @context (Outer) } value { bixby.mediaResolver.SongTitle (Bohemian Rhapsody) }}/ Category: Music | 0.95 | 1 | #### |
| 2 | Intent { goal { bixby.mediaResolver.Play @context (Outer) } value { bixby.mediaResolver.MovieTitle (Bohemidan Rhapsody) }}/ Category: Movie | 0.9 | 2 | |

In an embodiment, the processor 540 may store one or more commands in the memory 530 according to the format of Table 3. The processor 540 may store commands including information about capsules in the memory 530. The processor 540 may obtain goal information corresponding to the command through the natural language platform 220 based on the capsule information included in the command. The processor 540 may perform the operation corresponding to the command based on the obtained goal information.

TABLE 3

| ID | commands | confidence score | matched ID | executed ID |
|---|---|---|---|---|
| 1 | Capsule: bixby.music | 0.95 | 1 | #### |
| 2 | Capsule: bixby.movie | 0.9 | 2 | |

In operation 603, in an embodiment, the processor 540 may execute an operation corresponding to a first command among one or more commands.

In an embodiment, the processor 540 may execute the operation corresponding to the first command having the highest confidence score with the first utterance among one or more commands. In an embodiment, the processor 540 may identify one or more commands stored in the memory 530 and confidence scores respectively corresponding to the one or more commands. The processor 540 may determine the command corresponding to the highest confidence score among the one or more commands as the first command. The processor 540 may execute the operation corresponding to the first command based on goal, category, and capsule-related information included in the command.

In operation 605, in an embodiment, the processor 540 may identify whether a second utterance is an utterance for correcting the operation corresponding to the first command.

In an embodiment, the processor 540 may identify whether the second utterance is an utterance for correcting the operation corresponding to the first command based on the second utterance obtained through the microphone 510. The second utterance may be a user utterance obtained after the first utterance.

In an embodiment, the processor 540 may identify whether the second utterance is an utterance for correcting the operation corresponding to the first command, based on a time interval between the first utterance and the second utterance. In an embodiment, the processor 540 may identify whether the second utterance is an utterance for correcting the operation corresponding to the first command, based on obtaining the second utterance within a preset time from the time of obtaining the first utterance.

In an embodiment, the processor 540 may obtain one or more commands corresponding to the second utterance, using the natural language platform 220, based on obtaining the second utterance after the preset time from the time of obtaining the first utterance. The processor 540 may determine the command having the highest confidence score among the one or more commands obtained from the second utterance, as the second command. The processor 540 may execute the operation corresponding to the determined second command, based on information related to at least one of the goal, category, and capsule included in the second command.

In an embodiment, the processor 540 may determine that the second utterance is a correction utterance, based on identifying whether the second utterance is a negative response. The correction utterance may be an utterance for correcting the operation corresponding to the first command. For example, the negative response may be an utterance having a negative meaning, such as "No. Not that one," "No, rather than that," or "No. That's not." In an embodiment, the processor 540 may previously store a pattern regarding the negative response. In an embodiment, the processor 540 may compare the second utterance with the pre-stored pattern regarding the negative response using the natural language platform 220, determining whether the second utterance is a correction utterance. In an embodiment, the processor 540 may determine that the second utterance is a correction utterance based on identifying that some phrases of the second utterance match the pattern regarding the negative response.

In an embodiment, the processor 540 may obtain a first label and a second label from the second utterance using a pre-trained utterance identification model. The first label may be a label including information regarding whether the second utterance is the correction utterance. The second label may be a label including information regarding a correction phrase. The correction phrase may be a word or sentence related to the operation corresponding to the second utterance. The pre-trained utterance identification model can be a natural language processing model trained on training data including numerous second utterances having their respective first labels. Also, the training data includes numerous second utterances having their respective second labels. The pre-trained utterance identification model is trained on the training data to classify input second utterances as the first labels and the second labels. In one or more embodiments, learning algorithms of the pre-trained utterance identification model may include, but are not limited to, e.g., supervised learning, unsupervised learning, semi-supervised learning, or reinforcement learning. The pre-trained utterance identification model can include an artificial intelligence model that may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto.

In an embodiment, the processor 540 may identify whether the second utterance is an utterance for correcting the operation corresponding to the first command, based on identifying the first label. The processor 540 may identify the correction phrase included in the second utterance based on identifying the second label. In an embodiment, the correction phrase may include a start token and an end token.

In an embodiment, the processor 540 may identify the correction phrase included in the second utterance according to the second label, based on identifying that the second utterance is the correction utterance according to the first label.

In an embodiment, the processor 540 may identify whether the second utterance is the correction utterance based on the first label after obtaining the correction phrase based on the second label.

In an embodiment, the processor 540 may simultaneously identify whether the second utterance is the correction utterance based on the first label and identify the correction phrase included in the second utterance based on the second label.

The processor 540 may obtain the confidence score between the one or more commands except for the first command and the correction phrase. In an embodiment, the processor 540 may obtain the confidence score between each of the one or more commands except for the first command and the correction phrase, based on identifying at least one piece of label information corresponding to the one or more commands. The processor 540 may determine that the command having the highest confidence score with the correction phrase among the one or more commands except for the first command is the second command. The processor 540 may perform the operation corresponding to the second command based on information related to at least one of the goal, category, and capsule included in the second command.

In an embodiment, the processor 540 may obtain the second utterance, such as "No. Not that one." The processor 540 may determine that the second utterance is the correction utterance based on identifying that the first label output from the utterance identification model is true. The processor 540 may identify that the second utterance does not include the correction phrase, based on identifying that the second label is not output from the utterance identification model. The processor 540 may generate speech asking the intent of the second utterance through the speaker 520 to obtain the correction phrase.

In an embodiment, the processor 540 may obtain the second utterance, such as "No. Not that one. A movie starring Remi." The processor 540 may determine that the second utterance is the correction utterance based on identifying that the first label output from the utterance identification model is true. The processor 540 may determine that "A movie starring Remi" is the correction phrase based on the second label output from the utterance identification model. The processor 540 may obtain the confidence score between label information corresponding to one or more commands and the correction phrase. The processor 540 may determine that a command having a high confidence score is the second command. The processor 540 may execute the operation corresponding to the second command based on the information included in the second command.

In operation 607, in an embodiment, the processor 540 may determine the second command having the highest confidence score with the second utterance.

In an embodiment, the processor 540 may determine the second command having the highest confidence score with the second utterance among one or more commands except for the first command based on identifying that the second utterance is an utterance for correcting the operation corresponding to the first command.

In an embodiment, the processor 540 may identify label information corresponding to the one or more commands except for the first command. The label information may be information regarding data representing at least one of the goal, category, capsule, and signal.

TABLE 4

| Label ID | Label Name | Label Type | Label Info1 | Label Info2 | Label Info3 |
|---|---|---|---|---|---|
| 1 | bixby.mediaResolver.SongTitle | Signal | music, song, song title, . . . | play music, music play, start music, music start, . . . | {0.13243, 0.242421, 0.12311, . . . } |
| 2 | bixby.mediaResolver.MovieTitle | Signal | movie, movie title, title, . . . | play movie, movie play, show me movie, start movie, movie start, . . . | {0.83441, 0.092421, 0.7311, . . . } |
| . . . | . . . | . . . | . . . | . . . | . . . |

In an embodiment, the processor 540 may identify the label ID of Table 4 corresponding to one or more commands by identifying the matched ID of the one or more commands. The processor 540 may identify the label information based on information regarding the signal included in the one or more commands. In an embodiment, the label information corresponding to the one or more commands may include at least one of command-related text and an embedding vector into which the text is converted. The format of the label information may be text or embedding vector. In an embodiment, the first label information (Label info1) may be a text word. The format of the second label information (Label info2) may be a text sentence. The format of the third label information (Label info3) may be an embedding vector.

TABLE 5

| Label ID | Label Name | Label Type | Label Info1 | Label Info2 | Label Info3 |
|---|---|---|---|---|---|
| 3 | MUSIC | Category | music, song, singer, song title, . . . | play music, music play, start music, music start, . . . | {0.1921, 0.00201, 0.7002, . . .} |
| 4 | MOVIE | Category | movie, movie title, actor, actress, . . . | play movie, movie play, show me movie, start movie, movie start, . . . | {0.033, 0.091, 0.002311, . . .} |
| . . . | . . . | . . . | . . . | . . . | . . . |

In an embodiment, the processor 540 may identify the label ID of Table 5 corresponding to each of one or more commands by identifying the matched ID of each of the one or more commands. The processor 540 may identify the label information based on information regarding the category included in each of the one or more commands.

TABLE 6

| Label ID | Label Name | Label Type | Label Info1 | Label Info2 | Label Info3 |
|---|---|---|---|---|---|
| 5 | bixby.music | Capsule | music, song, song singer, artist, song title, . . . | play music, music play, start music, music start, show me music list, show me playlist, stop music, music stop, pause music . . . | {0.9743, 0.232421, 0.12311, . . .} |
| 6 | bixby.movie | Capsule | movie, movie title, actor, actress, . . . | play movie, movie play, show me movie, start movie, movie start, recommend a movie, . . . | {0.1213, 0.521, 0.10011, . . .} |
| . . . | . . . | . . . | . . . | . . . | . . . |

In an embodiment, the processor 540 may identify the label ID of Table 6 corresponding to each of one or more commands by identifying the matched ID of each of the one or more commands. The processor 540 may identify the label information based on information regarding the capsule included in each of the one or more commands.

In an embodiment, the processor 540 may obtain the confidence score between each of the one or more commands and the second utterance by comparing the second utterance with the label information. The processor 540 may obtain (or produce) the confidence score between at least one of the first label, second label, and third label with the second utterance. In an embodiment, the processor 540 may determine that the command having the highest confidence score with the second utterance among the one or more commands except for the first command is the second command. The processor 540 may perform the operation corresponding to the second command based on the information included in the determined second command.

In an embodiment, the processor 540 may generate one or more patterns based on the label information. The processor 540 may compare the second utterance with one or more patterns, such as "<first label>I mean", "<second label>I mean", or "<negative response>, <first label>", in order to determine the command having the highest confidence score with the second utterance among the one or more commands.

In operation 609, in an embodiment, the processor 540 may execute the operation corresponding to the second command.

In an embodiment, the processor 540 may execute the operation corresponding to the second command, based on information related to at least one of the goal, category, capsule, and signal included in the determined second command. In an embodiment, the processor 540 may determine the command matching the utterance intent based on the confidence score corresponding to each of the one or more commands obtained from at least one of the first utterance and the second utterance. The processor 540 may enhance the quality of user experience by executing the operation corresponding to the command matching the utterance intent.

Figure 7:
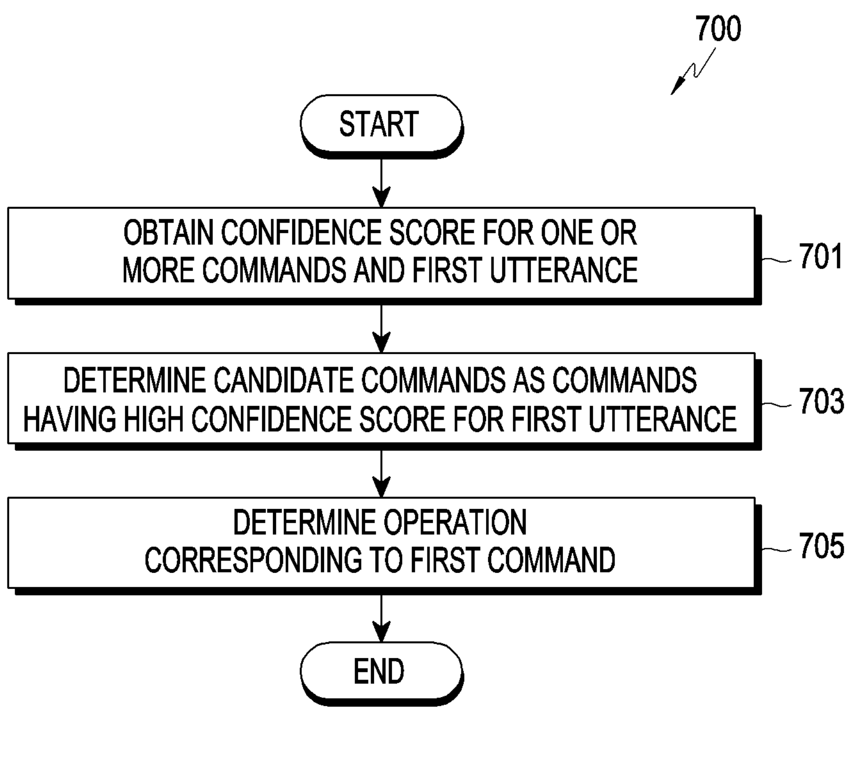
FIG. 7 is a flowchart illustrating an operation of determining candidate commands by an electronic device according to an embodiment of the disclosure.

FIG. 7 is a flowchart 700 illustrating an operation of determining candidate commands by an electronic device 500 according to an embodiment of the disclosure.

Referring to FIG. 7, in operation 701, in an embodiment, the processor 540 may obtain a confidence score between each of one or more commands and a first utterance.

In an embodiment, the processor 540 may obtain the confidence score for each of the one or more commands using the natural language platform 220. In an embodiment, the confidence score may have a value of 1 or 0. The processor 540 may determine that there are one or more intents corresponding to the first utterance, based on obtaining one or more commands having a confidence score of 1. In an embodiment, the confidence score may have a value of a finite decimal value between 0 and 1. The processor 540 may determine that there are one or more intents corresponding to the first utterance, based on obtaining one or more commands having a confidence score exceeding a preset reference value. In an embodiment, the processor 540 may obtain a confidence score for each of the one or more commands through communication with a server (e.g., the intelligent server 200 of FIG. 2 or the server 408 of FIG. 4).

In operation 703, in an embodiment, the processor 540 may determine commands having a high confidence score with the first utterance as candidate commands.

In an embodiment, the processor 540 may filter at least one command having a low confidence score by determining that one or more commands having a confidence score with the first utterance which is a preset confidence score or more are candidate commands.

In operation 705, in an embodiment, the processor 540 may determine the operation corresponding to the first command.

In an embodiment, the processor 540 may determine the operation corresponding to the first command having the highest confidence score with the first utterance among the candidate commands. The processor 540 may execute the operation corresponding to the first command based on the information included in the determined first command.

Figure 8:
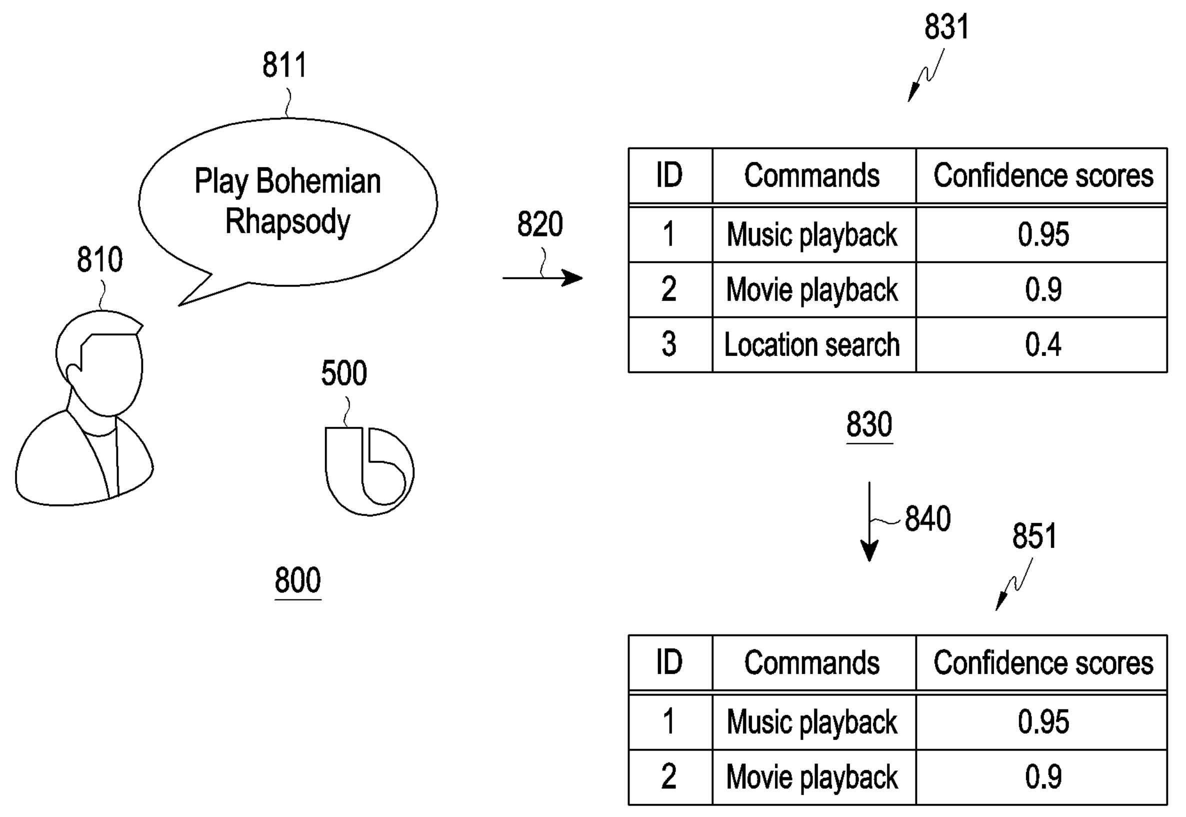
FIG. 8 is an example view illustrating an operation of determining candidate commands by an electronic device according to an embodiment of the disclosure.

FIG. 8 is an example view illustrating an operation of determining candidate commands 851 by an electronic device 500 according to an embodiment of the disclosure.

Referring to reference numeral 800, the electronic device 500 (e.g., the processor 540) may obtain the first utterance 811 of the user 810 through the microphone 510. The processor 540 may obtain one or more commands corresponding to the first utterance 811 based on the obtained first utterance 811. In an embodiment, the one or more commands may include "Bohemian Rhapsody" music playback, "Bohemian Rhapsody" movie playback, and "Bohemian Rhapsody" location search.

Referring to reference numeral 830, the processor 540 may obtain (820) a confidence score between each of one or more commands 831 and the first utterance 811 using the natural language platform 220. In an embodiment, the processor 540 may determine (840) that commands having a confidence score of a preset confidence score or more are candidate commands. The processor 540 may filter at least one command having a low confidence score by determining (or extracting) candidate commands. In one example, the processor 540 may select commands having a confidence score of a preset confidence score of "0.9" or higher.

Referring to reference numeral 850, the processor 540 may store candidate commands 851 and confidence scores respectively corresponding to the commands in the memory 530. The processor 540 may determine that a music playback command having the highest confidence score among the candidate command is the first command. The processor 540 may execute the operation corresponding to the first command. The processor 540 may play music titled "Bohemian Rhapsody" based on the information included in the music playback command. In an embodiment, the processor 540 may execute a music playback application to play music.

Figure 9:
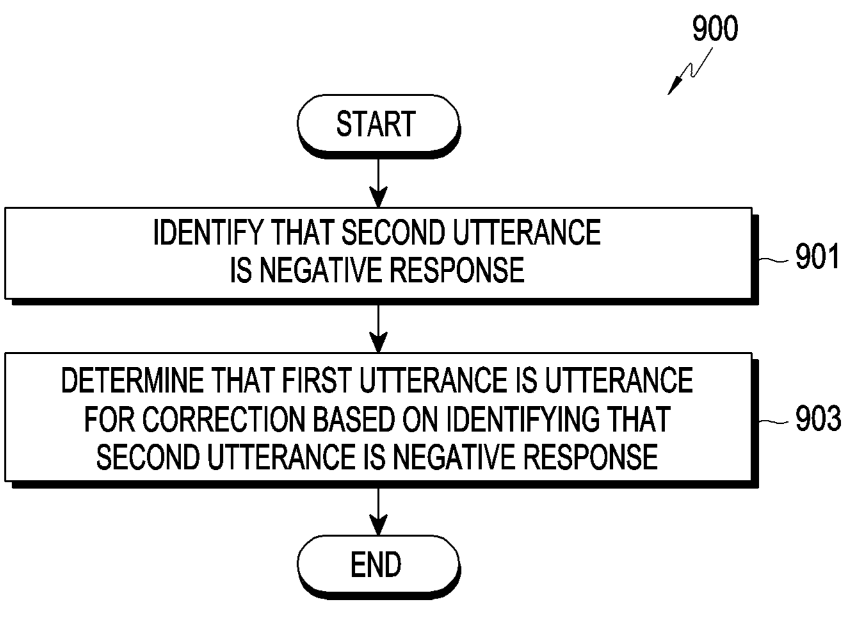
FIG. 9 is a flowchart illustrating an operation of identifying whether a second utterance is a correction utterance by an electronic device according to an embodiment of the disclosure.

FIG. 9 is a flowchart 900 illustrating an operation of identifying whether a second utterance is a correction utterance by an electronic device 500 according to an embodiment of the disclosure.

Referring to FIG. 9, in operation 901, in an embodiment, the processor 540 may identify whether the second utterance is a negative response.

In an embodiment, the processor 540 may compare the second utterance with a preset utterance pattern, identifying whether the obtained second utterance is a negative response. In an embodiment, the processor 540 may previously store an utterance pattern regarding a negative response, such as "No. Not that one," "No. Rather than that," or "No. That's not." In an embodiment, the processor 540 may compare the second utterance with the pre-stored pattern regarding the negative response using the natural language platform 220, thereby identifying whether the second utterance is a negative response. The processor 540 is configured to determine that the second utterance matches the utterance pattern for a negative response. In one or more embodiments, the processor 540 can determine that the matching terms have the same meaning although their semantics may differ, as understood by one of ordinary skill in the art.

In operation 903, in an embodiment, the processor 540 may determine whether the second utterance is an utterance for correcting the operation corresponding to the first command based on identifying that the second utterance is a negative response.

In an embodiment, the processor 540 may determine that the second utterance is a correction utterance based on identifying that some phrases of the second utterance match the pattern regarding the negative response. The processor 540 may determine a command matching the second utterance among one or more commands except for the first command by analyzing the correction utterance.

Figure 10A:
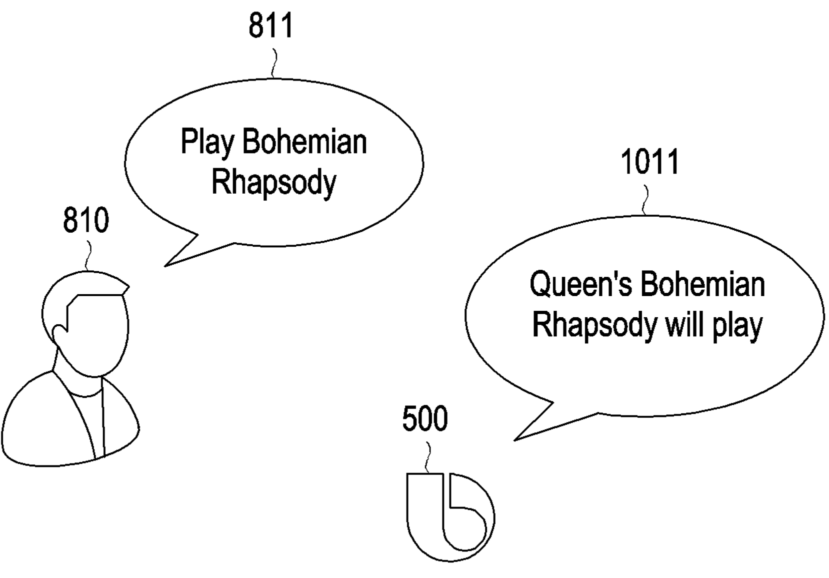
FIGS. 10A and 10B are views illustrating an example of executing an operation corresponding to a first utterance and a second utterance by an electronic device according to an embodiment of the disclosure.
Figure 10B:
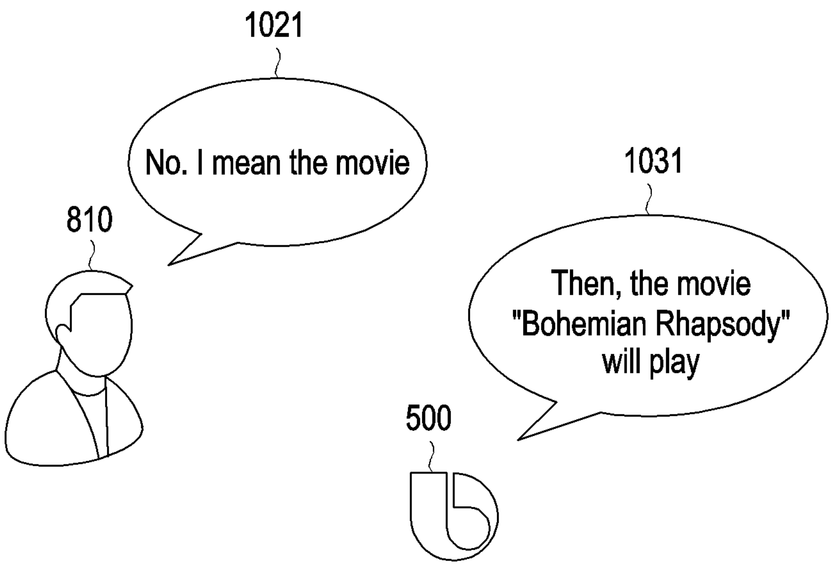

FIGS. 10A and 10B are views illustrating an example of executing an operation corresponding to a first utterance 811 and a second utterance 1021 by an electronic device 500 according to an embodiment of the disclosure.

Referring to FIG. 10A, the electronic device 500 (e.g., the processor 540) may obtain the first utterance 811 of the user 810 through the microphone 510. In an embodiment, the first utterance 811 may be "Play Bohemian Rhapsody". The processor 540 may obtain one or more commands corresponding to the first utterance 811 and the confidence score for each of the commands and the first utterance 811 using the natural language platform 220. In an embodiment, the one or more commands may include music playback, movie playback, and location search related to "Bohemian Rhapsody". The processor 540 may determine the command having the highest confidence score among the one or more commands as the first command. In an embodiment, the command having the highest confidence score with the first utterance 811 may be playing music titled "Bohemian Rhapsody". The processor 540 may output a speech 1011 corresponding to the first command through the speaker 520. The processor 540 may determine the domain related to the operation corresponding to the first command based on the information included in the first command. In an embodiment, the processor 540 may execute a media streaming application to perform music playback operation.

Referring to FIG. 10B, the electronic device 500 (e.g., the processor 540) may obtain the second utterance 1021 of the user 810 through the microphone 510. In an embodiment, the second utterance 1021 may be "No. I mean the movie." The processor 540 may determine whether the second utterance is the correction utterance based on identifying that the second utterance 1021 is a negative response. In an embodiment, the processor 540 may identify a negative response from "No. I mean the movie," by comparing the second utterance 1021 with the negative response pattern. The processor 540 may determine that the second utterance is the correction utterance based on identifying that the second utterance is a negative response. The processor 540 may determine that the command having the highest confidence score with the second utterance among the one or more commands except for the first command is the second command. In an embodiment, the processor 540 may obtain a confidence score for one or more commands except for the first command and the second utterance by comparing the second utterance 1021 with label information about each of the one or more commands. In an embodiment, the processor 540 may identify that the confidence score for the second utterance 1021 and the label information corresponding to the movie playback command is highest based on recognizing "movie" in the second utterance 1021. In an embodiment, the processor 540 may determine that the movie playback command among the one or more commands except for the first command is the second command. The processor 540 may output a speech 1031 corresponding to the second command through the speaker. The processor 540 may perform the movie playback operation based on the determined second command.

Figure 11:
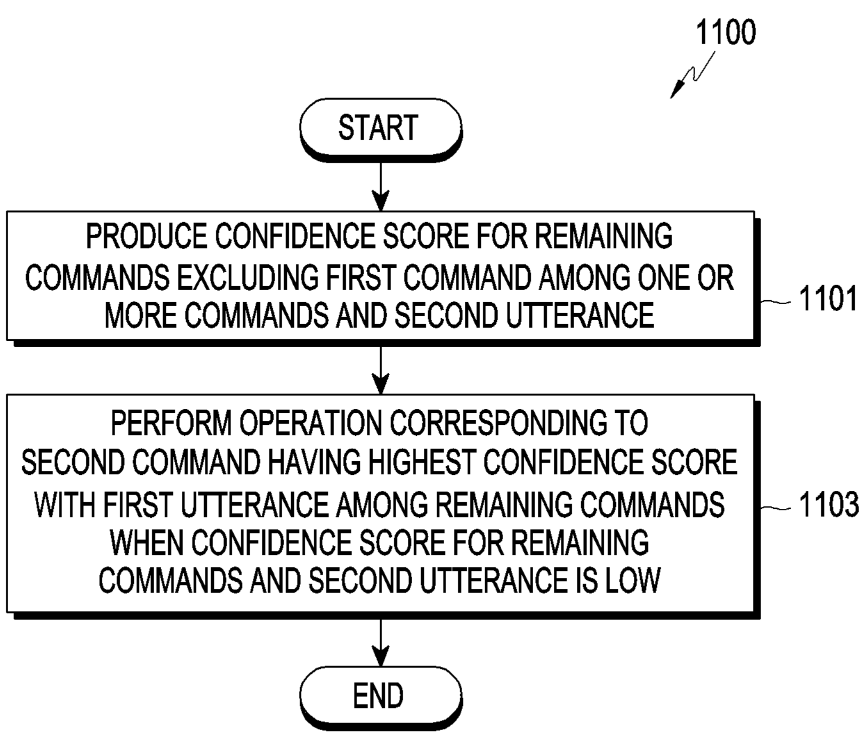
FIG. 11 is a flowchart illustrating an operation of determining a second command based on a second utterance by an electronic device according to an embodiment of the disclosure.

FIG. 11 is a flowchart 1100 illustrating an operation of determining a second command based on a second utterance by an electronic device 500 according to an embodiment of the disclosure.

In an embodiment, upon obtaining a second utterance only including a negative response, the electronic device 500 (e.g., the processor 540 of FIG. 5) may determine the second command between the confidence score between the remaining commands except for the first command and the first utterance.

Referring to FIG. 11, in operation 1101, in an embodiment, the processor 540 may obtain (or produce) the confidence score for each of the remaining commands except for the first command and the second utterance.

In an embodiment, the processor 540 may obtain the confidence score for each of the remaining commands and the second utterance by comparing the second utterance with the label information about the remaining commands. The processor 540 may identify the label information corresponding to each of the remaining commands based on the matched ID corresponding to each of the remaining commands.

In operation 1103, in an embodiment, the processor 540 may perform the operation corresponding to the second command having the highest confidence score with the first utterance based on identifying that the confidence score for each of the remaining commands and the second utterance is low.

In an embodiment, the processor 540 may obtain the second utterance only including a negative response. The processor 540 may determine a command associated with the first utterance among the remaining commands except for the first command based on identifying that the obtained confidence scores are smaller than a preset confidence score. In an embodiment, the processor 540 may determine the second command having the highest confidence score with the first utterance among the one or more commands except for the first command. The processor 540 may perform the operation corresponding to the determined second command. In an embodiment, when the processor 540 may not determine the command having a high confidence score with the second utterance, the processor 540 may determine the second command having the highest confidence score with the first utterance among the one or more remaining commands except for the first command, in order to execute the operation corresponding to the utterance intent.

Figure 12:
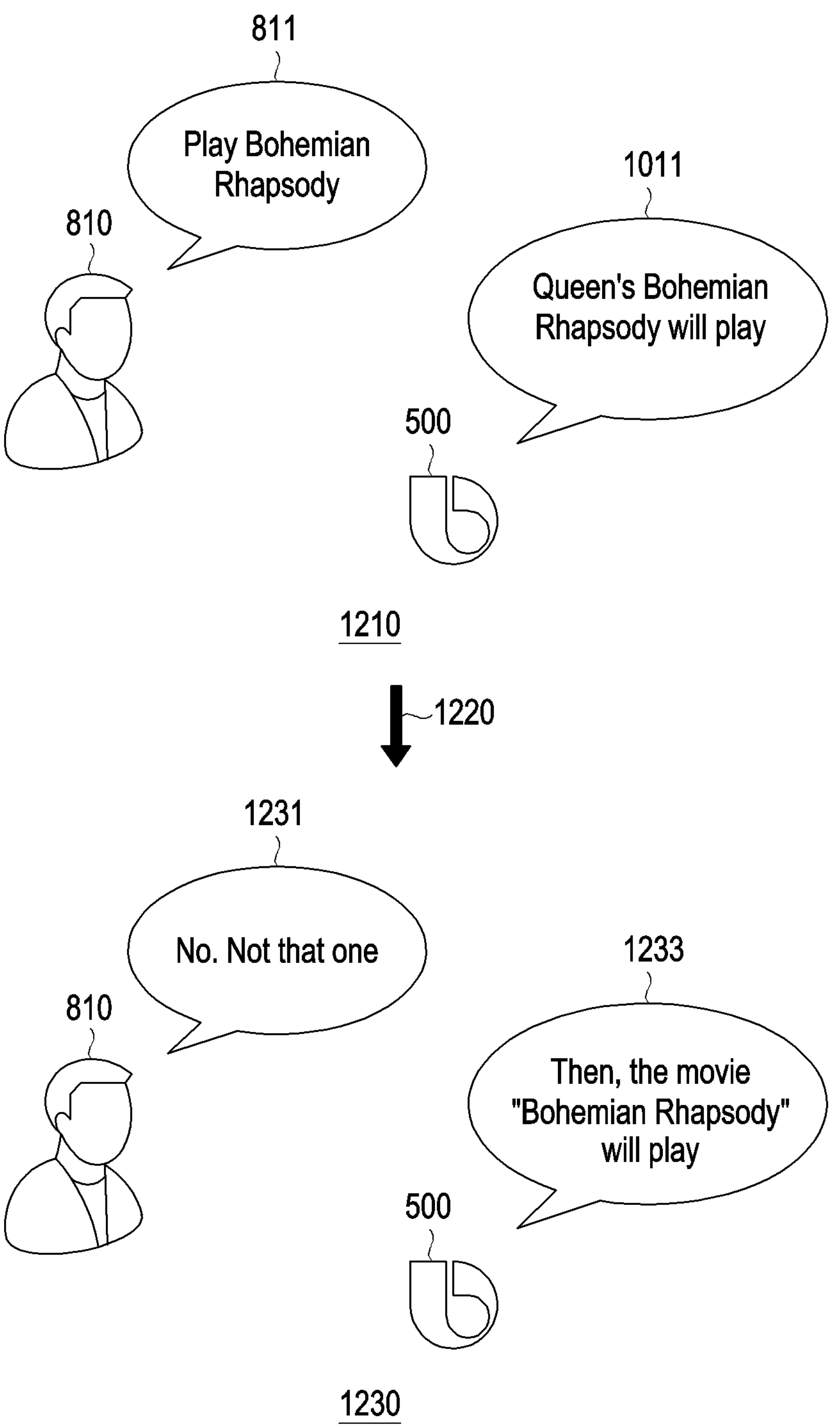
FIG. 12 is an example view illustrating an operation of determining a second command based on a second utterance by an electronic device according to an embodiment of the disclosure.

FIG. 12 is an example view illustrating an operation of determining a second command based on a second utterance 1231 by an electronic device 500 according to an embodiment of the disclosure.

Referring to reference numeral 1210, the electronic device 500 (e.g., the processor 540) may obtain the first utterance 811 of the user 810 through the microphone 510. In an embodiment, the first utterance 811 may be "Play Bohemian Rhapsody". The processor 540 may obtain one or more commands corresponding to the first utterance 811 and the confidence score for each of the commands and the first utterance 811 using the natural language platform 220. In an embodiment, the one or more commands may include music playback, movie playback, and location search related to "Bohemian Rhapsody". The processor 540 may determine the command having the highest confidence score among the one or more commands as the first command. In an embodiment, the command having the highest confidence score with the first utterance 811 may be playing music titled "Bohemian Rhapsody". The processor 540 may output a speech 1011 corresponding to the first command through the speaker 520. The processor 540 may determine the domain related to the operation corresponding to the first command based on the information included in the first command. In an embodiment, the processor 540 may execute a media streaming application to perform music playback operation. The processor 540 may obtain (1220) a second utterance within a preset time from the time of obtaining the first utterance 811.

Referring to reference numeral 1230, the electronic device 500 (e.g., the processor 540) may obtain the second utterance 1231 of the user 810 through the microphone 510. In an embodiment, the second utterance 1231 may be "No. Not that one." The processor 540 may determine whether the second utterance 1231 is the correction utterance based on identifying that the second utterance 1231 is a negative response. In an embodiment, the processor 540 may identify a negative response from "No. Not that one," by comparing the second utterance 1231 with the negative response pattern. The processor 540 may determine that the second utterance 1231 is a correction utterance based on identifying that the second utterance 1231 is a negative response.

In an embodiment, the processor 540 may determine that the command having the highest confidence score with the second utterance 1231 among the one or more commands except for the first command is the second command. In an embodiment, the processor 540 may obtain a confidence score for one or more commands except for the first command and the second utterance 1231 by comparing the second utterance 1231 with label information about each of the one or more commands. In an embodiment, the processor 540 may compare the obtained confidence scores with a preset confidence score. The processor 540 may identify that the second utterance 1231 does not include the correction phrase based on all of the confidence scores for each of the remaining commands and the second utterance 1231 being smaller than the preset confidence score. The processor 540 may determine that the command having the highest confidence score with the first utterance 811 among the remaining commands is the second command based on identifying that the second utterance 1231 does not include the correction phrase. For example, although there was not a correction phrase with an explicit utterance of the term "movie" in the second utterance 1231, the processor 540 is configured to select the command having the highest confidence score with the first utterance 811 among the remaining commands to be the second command in FIG. 12. The processor 540 may perform the operation corresponding to the determined second command. In an embodiment, the processor 540 may determine that the movie playback command having the highest confidence score with the first utterance 811 among the remaining commands is the second command. The processor 540 may output a speech 1233 corresponding to the second command through the speaker. The processor 540 may perform the movie playback operation based on the determined second command.

Figure 13:
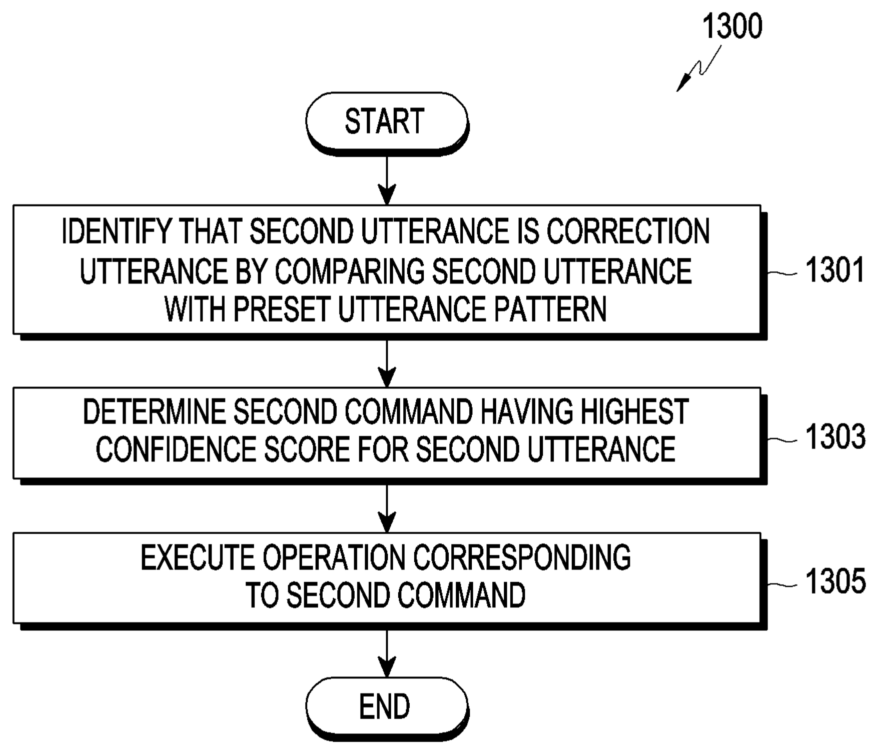
FIG. 13 is a flowchart illustrating an operation of identifying whether a second utterance is a correction utterance by an electronic device according to an embodiment of the disclosure.

FIG. 13 is a flowchart 1300 illustrating an operation of identifying whether a second utterance is a correction utterance by an electronic device 500 according to an embodiment of the disclosure.

Referring to FIG. 13, in operation 1301, in an embodiment, the processor 540 may identify whether the second utterance is a correction utterance.

In an embodiment, the processor 540 may compare the second utterance with a preset utterance pattern, identifying whether the second utterance is an utterance for correcting the operation corresponding to the first command. In an embodiment, the processor 540 may generate one or more patterns based on the label information. The processor 540 may compare the second utterance with one or more utterance patterns, such as "<first label> I mean", "<second label> I mean", or "<negative response>, <first label>", in order to determine whether the second utterance is an utterance for correcting the operation corresponding to the first command. The processor 540 is configured to search for a match in one or more terms between the second utterance and one or more utterance patterns. In one or more embodiments, the processor 540 can determine that the matching terms have the same meaning although their semantics may differ, as understood by one of ordinary skill in the art.

In operation 1303, in an embodiment, the processor 540 may determine the second command.

In an embodiment, the processor 540 may determine the second command having the highest confidence score with the second utterance among one or more commands except for the first command based on identifying that the second utterance is an utterance for correcting the operation corresponding to the first command. In an embodiment, the processor 540 may obtain a confidence score between one or more commands except for the first command and the second utterance 1231 by comparing the second utterance 1231 with label information about each of the one or more commands. The processor 540 may determine that the command having the highest confidence score with the second utterance among the one or more remaining commands except for the first command is the second command.

In an embodiment, the processor 540 may determine the second command based on the confidence scores between the remaining commands except for the first command and the first utterance according to operation 1101 or 1103 of FIG. 11, based on identifying that the second utterance includes a negative response.

In operation 1305, in an embodiment, the processor 540 may execute the operation corresponding to the determined second command.

In an embodiment, the processor 540 may execute the operation corresponding to the second command based on the information included in the determined second command. The operation of executing the operation corresponding to the second command by the processor 540 may correspond to operation 609.

Figure 14A:
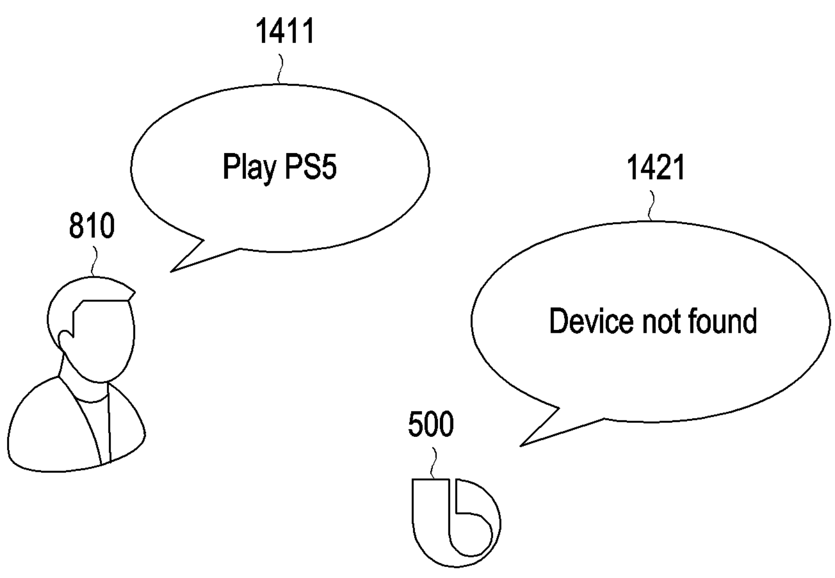
FIGS. 14A and 14B are views illustrating an example of executing an operation corresponding to a first utterance and a second utterance by an electronic device according to an embodiment of the disclosure.
Figure 14B:
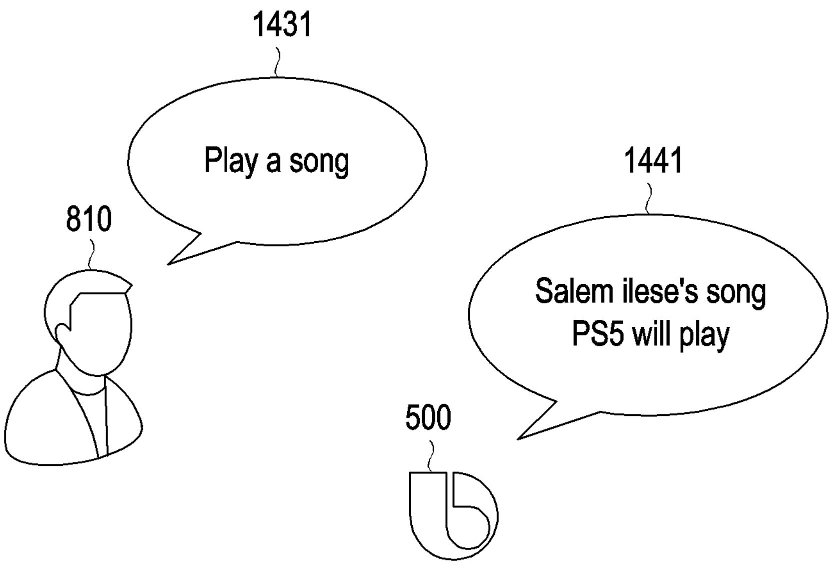

FIGS. 14A and 14B are views illustrating an example of executing an operation corresponding to a first utterance 1411 and a second utterance 1431 by an electronic device 500 according to an embodiment of the disclosure.

Referring to FIG. 14A, the electronic device 500 (e.g., the processor 540) may obtain the first utterance 1411 of the user 810 through the microphone 510. In an embodiment, the first utterance 1411 may be "Play PS5." The processor 540 may obtain one or more commands corresponding to the first utterance 1411 and the confidence score for each of the commands and the first utterance 1411 using the natural language platform 220. In an embodiment, the one or more commands may include executing the "PS5" electronic device and playing music. The processor 540 may determine that the command having the highest confidence score with the first utterance 1411 among the one or more commands is the first command. In an embodiment, the command having the highest confidence score with the first utterance 1411 may be executing the "PS5" electronic device. The processor 540 may determine the domain related to the operation corresponding to the first command based on the information included in the first command. In an embodiment, the processor 540 may search for the electronic device PS5 to execute the electronic device PS5. The processor 540 may output a speech 1421 indicating that the first command may not be performed through the speaker 520 based on identifying that communication between the electronic device PS5 and the electronic device 500 is not connected.

Referring to FIG. 14B, the electronic device 500 (e.g., the processor 540) may obtain the second utterance 1431 of the user 810 through the microphone 510. In an embodiment, the second utterance 1431 may be "Play music." In an embodiment, the processor 540 may compare the second utterance 1431 with a preset utterance pattern, identifying whether the second utterance 1431 is an utterance for correcting the operation corresponding to the first command. In an embodiment, the processor 540 may generate one or more patterns based on the label information. The processor 540 may compare the second utterance 1431 with one or more utterance patterns, such as "<first label> I mean", "<second label> I mean", or "<negative response>, <first label>", determining whether the second utterance 1431 is an utterance for correcting the operation corresponding to the first command. In an embodiment, the processor 540 may determine that the second utterance 1431 is an utterance for correcting the operation corresponding to the first command based on identifying that the "music" included in the second utterance matches the label information corresponding to the music playback command. The processor 540 may determine that the command having the highest confidence score with the second utterance 1431 among the one or more commands except for the first command is the second command, based on determining that the second utterance is the correction utterance. In an embodiment, the processor 540 may obtain a confidence score for one or more commands except for the first command and the second utterance by comparing the second utterance 1431 with label information about each of the one or more commands. In an embodiment, the processor 540 may identify that the confidence score between the second utterance 1431 and the label information corresponding to the music playback command is highest based on recognizing "music" in the second utterance 1431. In an embodiment, the processor 540 may determine that the music playback command among the one or more commands except for the first command is the second command. The processor 540 may output a speech 1441 corresponding to the second command through the speaker 520. The processor 540 may perform the music playback operation based on the determined second command. In an embodiment, the processor 540 may execute the operation corresponding to the music playback command based on identifying that the "music" included in the second utterance 1431 matches the label information about the music playback command.

According to an embodiment, an electronic device (100, 411, or 500) may comprise a microphone (120, 450, or 510) and at least one processor (160, 420, or 540) operatively connected with the microphone (120, 450, or 510). The at least one processor (160, 420, or 540) may obtain one or more commands corresponding to a first utterance (811 or 1411) obtained through the microphone (120, 450, or 510), based on the first utterance (811 or 1411). The at least one processor (160, 420, or 540) may execute an operation corresponding to a first command having a highest confidence score for the first utterance (811 or 1411) among the one or more commands. The at least one processor (160, 420, or 540) may identify that a second utterance (1021, 1231, or 1431) obtained through the microphone (120, 450, or 510) is an utterance for correcting the operation corresponding to the first command, based on the second utterance. The at least one processor (160, 420, or 540) may determine a second command having another highest confidence score for the second utterance (1021, 1231, or 1431) among the one or more commands except for the first command, based on identifying that the second utterance (1021, 1231, or 1431) is the utterance for correcting the operation corresponding to the first command. The at least one processor (160, 420, or 540) may be configured to execute another operation corresponding to the second command that is determined.

In an embodiment, the at least one processor (160, 420, or 540) may obtain a confidence score for the one or more commands and the first utterance (811 or 1411). The at least one processor (160, 420, or 540) may determine candidate commands as at least one of the one or more commands having the confidence score for the first utterance (811 or 1411) that is greater than a preset confidence score. The at least one processor (160, 420, or 540) may determine the operation corresponding to the first command having the highest confidence score with the first utterance (811 or 1411) among the candidate commands.

In an embodiment, the at least one processor (160, 420, or 540) may be configured to identify that the second utterance (1021, 1231, or 1431) is the utterance for correcting the operation corresponding to the first command, based on obtaining the second utterance (1021, 1231, or 1431) within a preset time from a time of obtaining the first utterance (811 or 1411).

In an embodiment, the at least one processor (160, 420, or 540) may obtain the one or more commands, based on obtaining the second utterance (1021, 1231, or 1431), after the preset time from the time of obtaining the first utterance (811 or 1411). The at least one processor (160, 420, or 540) may determine the second command having the another highest confidence score for the second utterance (1021, 1231, or 1431) among the one or more commands obtained from the second utterance (1021, 1231, or 1431). The at least one processor (160, 420, or 540) may be configured to execute the another operation corresponding to the second command that is determined.

In an embodiment, the at least one processor (160, 420, or 540) may identify that the second utterance (1021, 1231, or 1431) is a negative response by comparing the second utterance (1021, 1231, or 1431) with a preset utterance pattern. The at least one processor (160, 420, or 540) may determine that the second utterance (1021, 1231, or 1431) is the utterance for correcting the operation corresponding to the first command, based on identifying that the second utterance (1021, 1231, or 1431) is the negative response.

In an embodiment, the at least one processor (160, 420, or 540) may identify that the second utterance (1021, 1231, or 1431) is the utterance for correcting the operation corresponding to the first command by comparing the second utterance (1021, 1231, or 1431) with the preset utterance pattern. The at least one processor (160, 420, or 540) may determine the second command having the another highest confidence score for the second utterance (1021, 1231, or 1431) among the one or more commands except for the first command, based on identifying that the second utterance (1021, 1231, or 1431) is the utterance for correcting the operation corresponding to the first command. The at least one processor (160, 420, or 540) may be configured to execute the another operation corresponding to the second command.

In an embodiment, the at least one processor (160, 420, or 540) may obtain confidence scores for the one or more commands except for the first command and the second utterance (1021, 1231, or 1431). The at least one processor (160, 420, or 540) may be configured to perform the operation corresponding to the first command having the highest confidence score for the first utterance (811 or 1411) among the one or more commands except for the first command, based on identifying that the confidence scores obtained are smaller than a preset confidence score.

In an embodiment, the at least one processor (160, 420, or 540) may obtain a first label and a second label from the second utterance (1021, 1231, or 1431), using a pre-trained utterance identification model. The at least one processor (160, 420, or 540) may identify whether the second utterance (1021, 1231, or 1431) is the utterance for correcting the operation corresponding to the first command, based on the first label. The at least one processor (160, 420, or 540) may identify a correction phrase included in the second utterance (1021, 1231, or 1431), based on the second label. The at least one processor (160, 420, or 540) may obtain a confidence score for the one or more commands except for the first command and the correction phrase. The at least one processor (160, 420, or 540) may perform the another operation corresponding to the second command having the another highest confidence score for the correction phrase among the one or more commands except for the first command.

In an embodiment, the at least one processor (160, 420, or 540) may identify label information corresponding to the one or more commands except for the first command, based on identifying that the second utterance (1021, 1231, or 1431) is the utterance for correcting the operation corresponding to the first command. The at least one processor (160, 420, or 540) may be configured to obtain the confidence score between the one or more commands and the second utterance (1021, 1231, or 1431) by comparing the second utterance (1021, 1231, or 1431) with the label information.

In an embodiment, the label information corresponding to the one or more commands may include at least one of command-related text and an embedding vector into which the command-related text is converted.

According to an embodiment, a method for analyzing a user utterance by an electronic device may comprise obtaining one or more commands corresponding to a first utterance (811 or 1411) obtained through a microphone (120, 450, or 510), based on the first utterance (811 or 1411). The method may comprise executing an operation corresponding to a first command having a highest confidence score for the first utterance (811 or 1411) among the one or more commands. The method may comprise identifying that a second utterance (1021, 1231, or 1431) obtained through the microphone (120, 450, or 510) is an utterance for correcting the operation corresponding to the first command, based on the second utterance (1021, 1231, or 1431). The method may comprise determining a second command having another highest confidence score for the second utterance (1021, 1231, or 1431) among the one or more commands excluding the first command, based on identifying that the second utterance (1021, 1231, or 1431) is the utterance for correcting the operation corresponding to the first command. The method may comprise executing another operation corresponding to the second command that is determined.

In an embodiment, the method may comprise obtaining a confidence score for the one or more commands and the first utterance (811 or 1411). The method may comprise determining candidate commands as at least one of the one or more commands having the confidence score for the first utterance (811 or 1411) that is greater than a preset confidence score. The method may comprise determining the operation corresponding to the first command having the highest confidence score with the first utterance (811 or 1411) among the candidate commands.

In an embodiment, the method may further comprise identifying that the second utterance (1021, 1231, or 1431) is the utterance for correcting the operation corresponding to the first command, based on obtaining the second utterance (1021, 1231, or 1431) within a preset time from a time of obtaining the first utterance (811 or 1411).

In an embodiment, the method may comprise obtaining the one or more commands, based on obtaining the second utterance (1021, 1231, or 1431), after the preset time from the time of obtaining the first utterance (811 or 1411). The method may comprise determining the second command having the another highest confidence score for the second utterance (1021, 1231, or 1431) among the one or more commands obtained from the second utterance (1021, 1231, or 1431). The method may further comprise executing the another operation corresponding to the second command that is determined.

In an embodiment, the method may comprise identifying that the second utterance (1021, 1231, or 1431) is a negative response by comparing the second utterance (1021, 1231, or 1431) with a preset utterance pattern, and The method may further comprise determining that the second utterance (1021, 1231, or 1431) is the utterance for correcting the operation corresponding to the first command, based on identifying that the second utterance (1021, 1231, or 1431) is the negative response.

In an embodiment, the method may comprise identifying that the second utterance (1021, 1231, or 1431) is the utterance for correcting the operation corresponding to the first command by comparing the second utterance (1021, 1231, or 1431) with the preset utterance pattern. The method may comprise determining the second command having the another highest confidence score for the second utterance (1021, 1231, or 1431) among the one or more commands excluding the first command, based on identifying that the second utterance (1021, 1231, or 1431) is the utterance for correcting the operation corresponding to the first command. The method may further comprise executing the another operation corresponding to the second command.

In an embodiment, the method may comprise obtaining confidence scores for the one or more commands excluding the first command and the second utterance (1021, 1231, or 1431). The method may further comprise performing the operation corresponding to the first command having the highest confidence score for the first utterance among the one or more commands excluding the first command, based on identifying that the confidence scores obtained are smaller than a preset confidence score.

In an embodiment, the method may comprise obtaining a first label and a second label from the second utterance (1021, 1231, or 1431), using a pre-trained utterance identification model. The method may identify whether the second utterance (1021, 1231, or 1431) is the utterance for correcting the operation corresponding to the first command, based on the first label. The method may comprise identifying a correction phrase included in the second utterance (1021, 1231, or 1431), based on the second label. The method may comprise obtaining a confidence score for the one or more commands excluding the first command and the correction phrase. The method may further comprise performing the another operation corresponding to the second command having the another highest confidence score for the correction phrase among the one or more commands excluding the first command.

In an embodiment, the method may comprise identifying label information corresponding to the one or more commands excluding the first command, based on identifying that the second utterance (1021, 1231, or 1431) is the utterance for correcting the operation corresponding to the first command. The method may further comprise obtaining the confidence score between the one or more commands and the second utterance (1021, 1231, or 1431) by comparing the second utterance (1021, 1231, or 1431) with the label information.

In an embodiment, in the method, the label information corresponding to the one or more commands may include at least one of command-related text and an embedding vector into which the command-related text is converted.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 440) including one or more instructions that are stored in a storage medium (e.g., internal memory 436 or external memory 438) that is readable by a machine (e.g., the electronic device 411). For example, a processor (e.g., the processor 420) of the machine (e.g., the electronic device 411) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Further, the structure of the data used in embodiments of the disclosure may be recorded in a computer-readable recording medium via various means. The computer-readable recording medium includes a storage medium, such as a magnetic storage medium (e.g., a ROM, a floppy disc, or a hard disc) or an optical reading medium (e.g., a CD-ROM or a DVD).

Example embodiments of the disclosure have been described above. The above-described embodiments are merely examples, and it will be appreciated by one of ordinary skill in the art various changes may be made thereto without departing from the scope of the present invention. Hence, the methods disclosed herein should be interpreted not as limiting but as illustrative. The scope of the present invention should be construed by the following claims, and all technical spirits within equivalents thereof should be interpreted to belong to the scope of the present invention.

What is claimed is:

1. An electronic device comprising:

a microphone;

at least one processor operatively connected with the microphone; and memory storing instructions that, when executed by the at least one processor individually or collectively, cause the electronic device to:

obtain one or more commands corresponding to a first utterance obtained through the microphone, based on the first utterance, execute first operation corresponding to a first command having a highest confidence score for the first utterance among the one or more commands, wherein the one or more commands and corresponding confidence scores for the first utterance are stored in the memory, identify that a second utterance obtained through the microphone is an utterance for correcting the first operation corresponding to the first command, based on the second utterance, determine a second command having a highest confidence score for the second utterance among the one or more commands excluding the first command, based on identifying that the second utterance is the utterance for correcting the first operation corresponding to the first command, wherein determining the second command having the highest confidence score for the second utterance comprises: retrieving from the memory the one or more commands and the corresponding confidence scores for the one or more commands, and comparing the second utterance to the one or more commands excluding the first command to obtain the highest confidence score for the second utterance among the one or more commands retrieved from the memory, such that the second command is identified, and obtain a first label and a second label from the second utterance, using a pre-trained utterance identification model, identify whether the second utterance is the utterance for correcting the first operation corresponding to the first command, based on the first label, identify a correction phrase included in the second utterance, based on the second label obtain a confidence score for the one or more commands excluding the first command and the correction phrase, perform the second operation corresponding to the second command having the highest confidence score for the correction phrase among the one or more commands excluding the first command, and execute a second operation corresponding to the second command.

2. The electronic device of claim 1, wherein the instructions cause the electronic device to:

obtain a confidence score for the one or more commands and the first utterance, determine candidate commands as at least one of the one or more commands having the confidence score for the first utterance that is greater than a preset confidence score, and determine the first operation corresponding to the first command having the highest confidence score with the first utterance among the candidate commands.

3. The electronic device of claim 1, wherein the instructions cause the electronic device to identify that the second utterance is the utterance for correcting the first operation corresponding to the first command, based on obtaining the second utterance within a preset time from a time of obtaining the first utterance.

4. The electronic device of claim 3, wherein the instructions cause the electronic device to:

obtain the one or more commands, based on obtaining the second utterance, after the preset time from the time of obtaining the first utterance, determine the second command having the highest confidence score for the second utterance among the one or more commands obtained from the second utterance, and execute the second operation corresponding to the second command that is determined.

5. The electronic device of claim 1, wherein the instructions cause the electronic device to:

identify that the second utterance is a negative response by comparing the second utterance with a preset utterance pattern, and determine that the second utterance is the utterance for correcting the first operation corresponding to the first command, based on identifying that the second utterance is the negative response.

6. The electronic device of claim 5, wherein the instructions cause the electronic device to:

identify that the second utterance is the utterance for correcting the first operation corresponding to the first command by comparing the second utterance with the preset utterance pattern, determine the second command having the highest confidence score for the second utterance among the one or more commands excluding the first command, based on identifying that the second utterance is the utterance for correcting the first operation corresponding to the first command, and execute the second operation corresponding to the second command.

7. The electronic device of claim 1, wherein the instructions cause the electronic device to:

obtain confidence scores for the one or more commands excluding the first command and the second utterance, and perform the first operation corresponding to the first command having the highest confidence score for the first utterance among the one or more commands excluding the first command, based on identifying that the confidence scores obtained are smaller than a preset confidence score.

8. The electronic device of claim 1, wherein, prior to obtaining the second utterance through the microphone, the one or more commands are previously identified and stored in the memory when processing the first utterance.

9. The electronic device of claim 1, wherein the instructions cause the electronic device to:

identify label information corresponding to the one or more commands excluding the first command, based on identifying that the second utterance is the utterance for correcting the first operation corresponding to the first command, and obtain the confidence score between the one or more commands and the second utterance by comparing the second utterance with the label information.

10. The electronic device of claim 9, wherein the label information corresponding to the one or more commands includes at least one of command-related text and an embedding vector into which the command-related text is converted.

11. A method for analyzing a user utterance by an electronic device, the method comprising:

obtaining one or more commands corresponding to a first utterance obtained through a microphone, based on the first utterance;

executing a first operation corresponding to a first command having a highest confidence score for the first utterance among the one or more commands, wherein the one or more commands and corresponding confidence scores for the first utterance are stored in the memory;

identifying that a second utterance obtained through the microphone is an utterance for correcting the first operation corresponding to the first command, based on the second utterance;

determining a second command having a highest confidence score for the second utterance among the one or more commands excluding the first command, based on identifying that the second utterance is the utterance for correcting the first operation corresponding to the first command, wherein the determining the second command having the highest confidence score for the second utterance comprises: retrieving from the memory the one or more commands and the corresponding confidence scores for the one or more commands, and comparing the second utterance to the one or more commands excluding the first command to obtain the highest confidence score for the second utterance among the one or more commands retrieved from the memory, such that the second command is identified;

obtaining a first label and a second label from the second utterance, using a pre-trained utterance identification model;

identifying whether the second utterance is the utterance for correcting the first operation corresponding to the first command, based on the first label;

identifying a correction phrase included in the second utterance, based on the second label;

obtaining a confidence score for the one or more commands excluding the first command and the correction phrase;

performing the second operation corresponding to the second command having the highest confidence score for the correction phrase among the one or more commands excluding the first command; and executing a second operation corresponding to the second command.

12. The method of claim 11, further comprising:

obtaining a confidence score for the one or more commands and the first utterance;

determining candidate commands as at least one of the one or more commands having the confidence score for the first utterance that is greater than a preset confidence score; and determining the first operation corresponding to the first command having the highest confidence score with the first utterance among the candidate commands.

13. The method of claim 11, further comprising identifying that the second utterance is the utterance for correcting the first operation corresponding to the first command, based on obtaining the second utterance within a preset time from a time of obtaining the first utterance.

14. The method of claim 13, further comprising:

obtaining the one or more commands, based on obtaining the second utterance, after the preset time from the time of obtaining the first utterance;

determining the second command having the highest confidence score for the second utterance among the one or more commands obtained from the second utterance; and executing the second operation corresponding to the second command that is determined.

15. The method of claim 11, further comprising:

identifying that the second utterance is a negative response by comparing the second utterance with a preset utterance pattern, and determining that the second utterance is the utterance for correcting the first operation corresponding to the first command, based on identifying that the second utterance is the negative response.

16. The method of claim 15, further comprising:

identifying that the second utterance is the utterance for correcting the first operation corresponding to the first command by comparing the second utterance with the preset utterance pattern;

determining the second command having the highest confidence score for the second utterance among the one or more commands excluding the first command, based on identifying that the second utterance is the utterance for correcting the first operation corresponding to the first command; and executing the second operation corresponding to the second command.

17. The method of claim 11, further comprising:

obtaining confidence scores for the one or more commands excluding the first command and the second utterance; and performing the first operation corresponding to the first command having the highest confidence score for the first utterance among the one or more commands excluding the first command, based on identifying that the confidence scores obtained are smaller than a preset confidence score.

18. The method of claim 11, further comprising:

identifying label information corresponding to the one or more commands excluding the first command, based on identifying that the second utterance is the utterance for correcting the first operation corresponding to the first command; and obtaining the confidence score between the one or more commands and the second utterance by comparing the second utterance with the label information;

wherein the label information corresponding to the one or more commands includes at least one of command-related text and an embedding vector into which the command-related text is converted.

* * * * *